Sept. 4, 1934.  W. HOFMANN ET AL  1,972,265
TURFING MACHINE FOR MAKING PILE FABRICS
Filed April 6, 1931  5 Sheets-Sheet 3
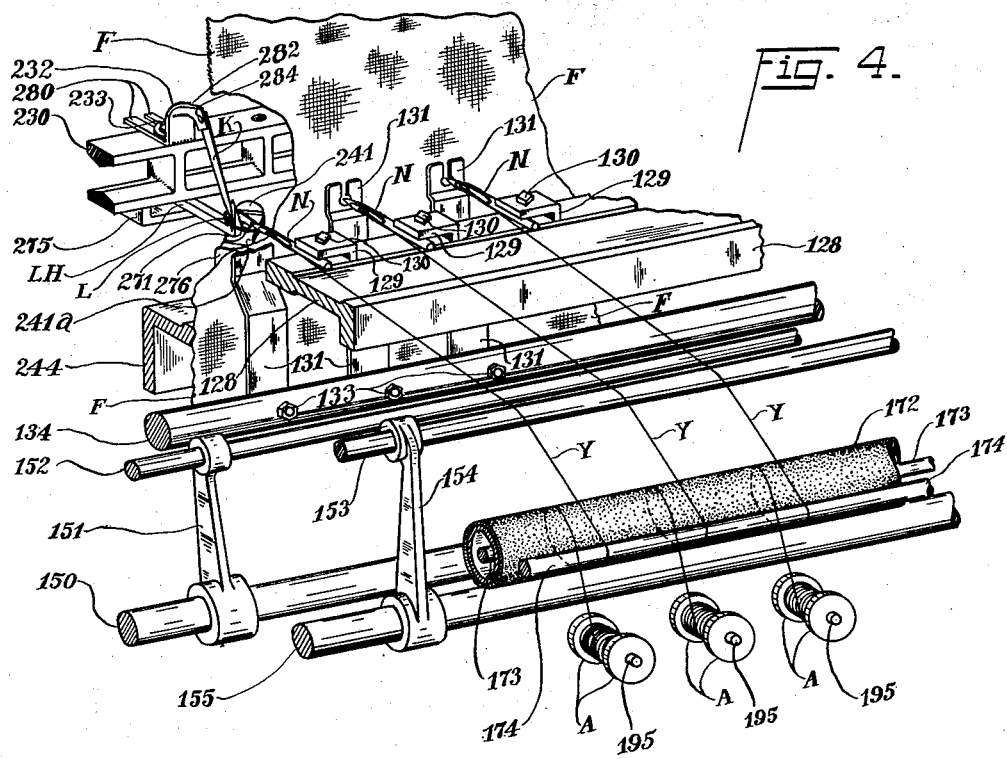
Fig. 4.
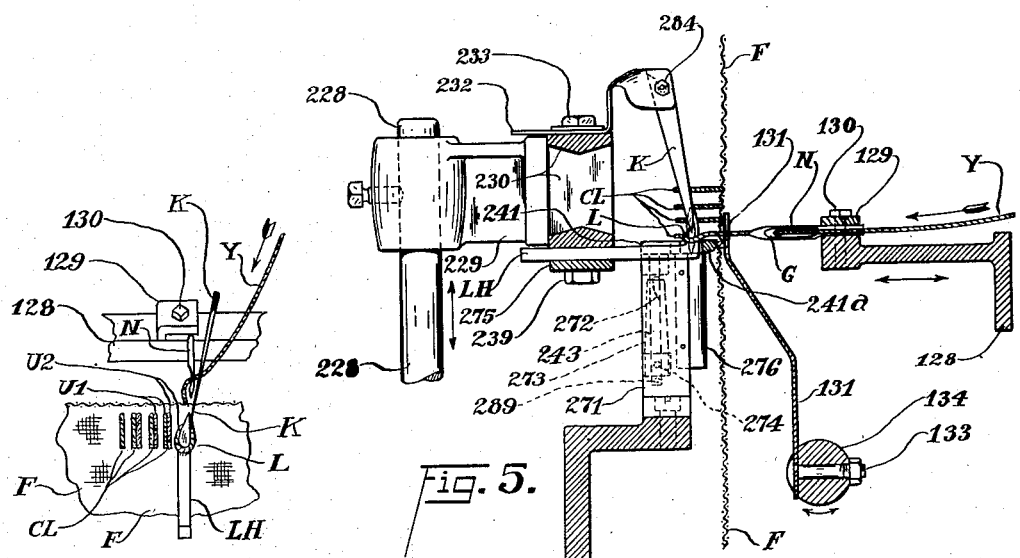
Fig. 5.
Fig. 5A.
INVENTORS
WILLY HOFMANN &
BY  OTTO FRANK GERBERT
Philip Farnsworth
ATTORNEY

INVENTORS
WILLY HOFMANN &
BY OTTO FRANK GERBERT
ATTORNEY

Patented Sept. 4, 1934

1,972,265

UNITED STATES PATENT OFFICE 1,972,265

TURFING MACHINE FOR MAKING PILE FABRICS

Willy Hofmann, West New York, and Otto Frank Gerbert, Union City, N. J., assignors to Hopeck Manufacturing Company, Inc., West New York, N. J., a corporation of New Jersey Application April 6, 1931, Serial No. 527,957

48 Claims. (Cl. 112—79)

This invention relates to improvements in turfing machines particularly of the multiple needle type and for making cut-loop pile fabrics, and more particularly of that type invented by us and shown in our prior application for patent Serial Number 484,010, filed 24 September, 1930, (and of which the present application is a continuation in part) for the manufacture of pile fabrics from a plurality of single-thread stitches simultaneously projected as loops thru the meshes of a base fabric, the loops being cut immediately in the machine to form thread-ends of a pile surface.

Among the objects of this invention is that of perfecting the machine of our said prior case so that with minimum attention by skilled persons its product will be uniformly perfect in all portions of the pile surface even when the product includes curved designs of pile threads as inside a border or background of plain or pile threads or pile-threads colored differently from those in the curved designs.

Figure 1:
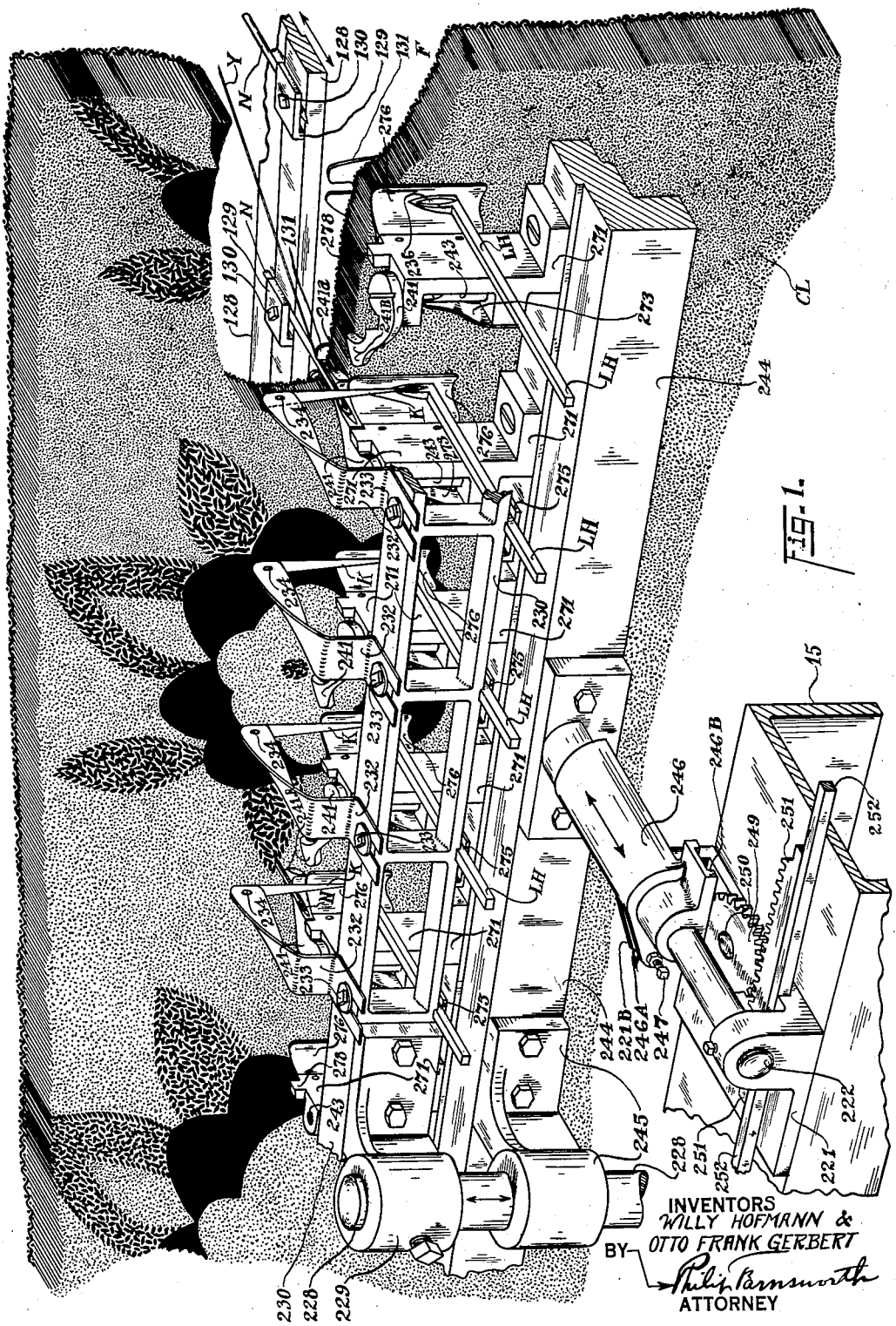
Figure 2:
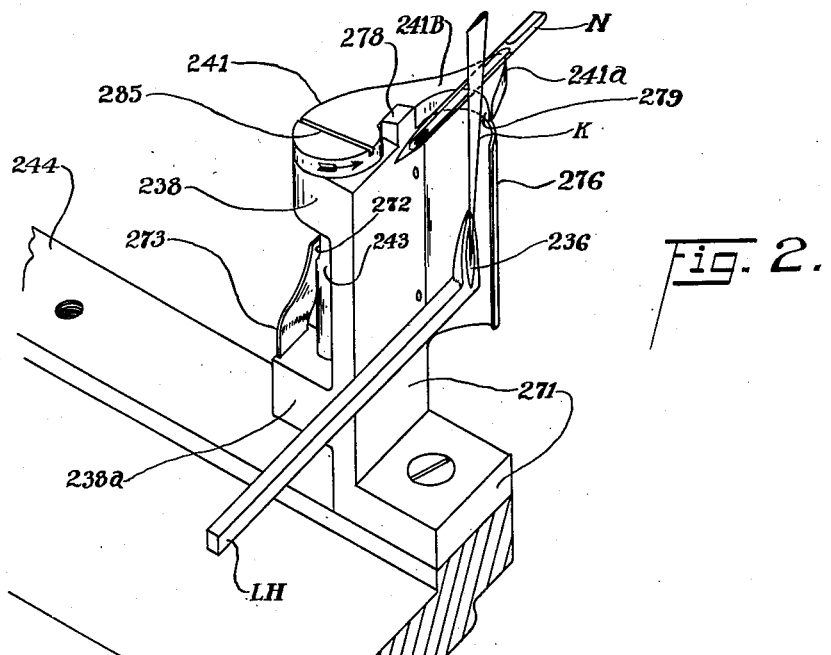
Figure 3:
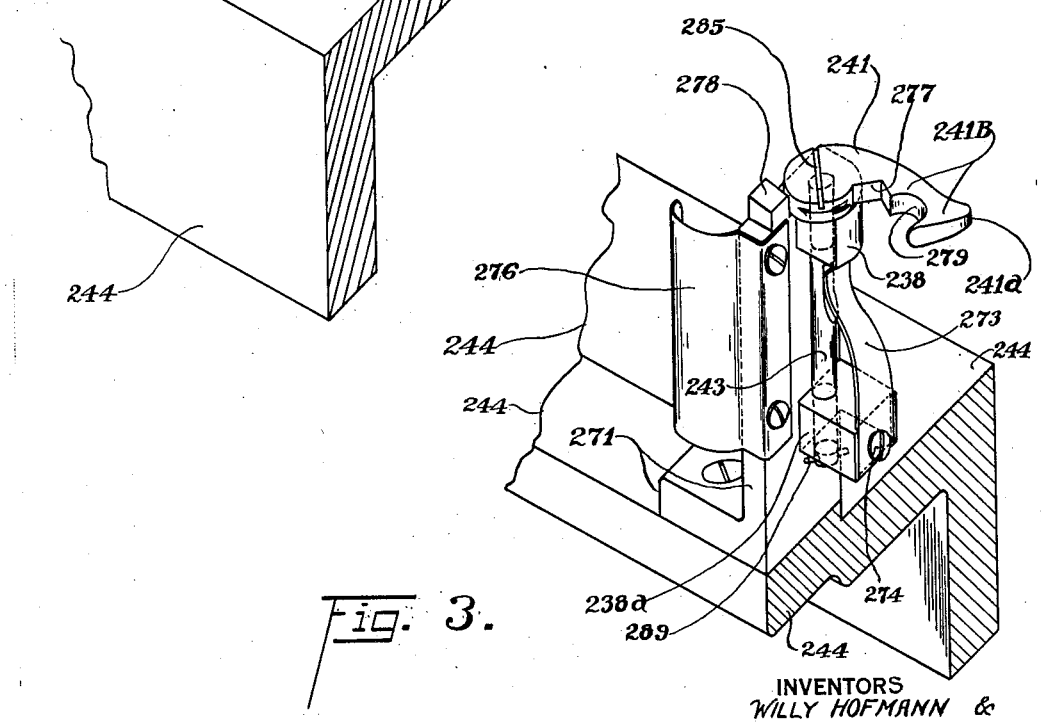
Figure 6:
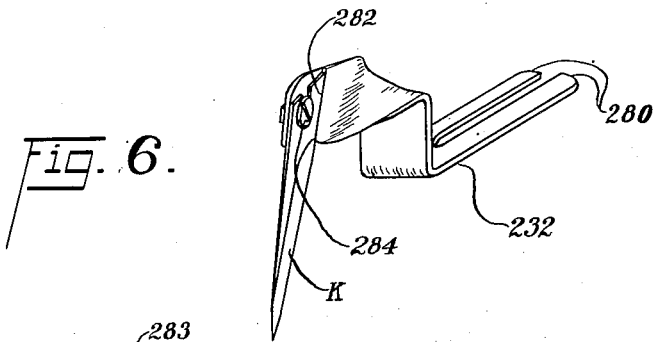
Figure 7:
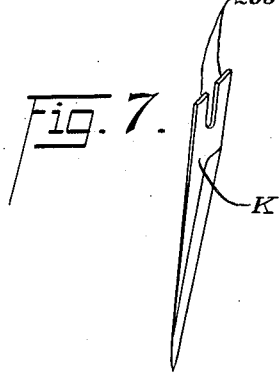
Figure 8:
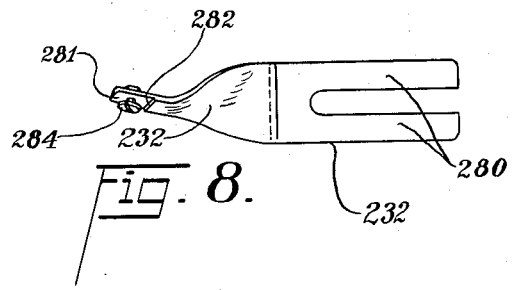
Figure 9:
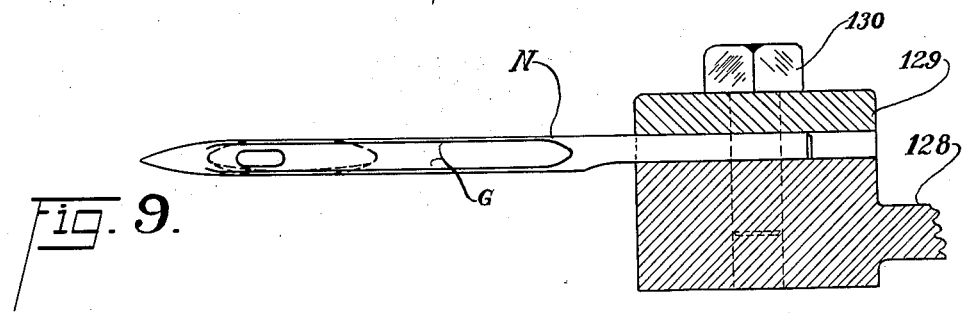
Figure 10:
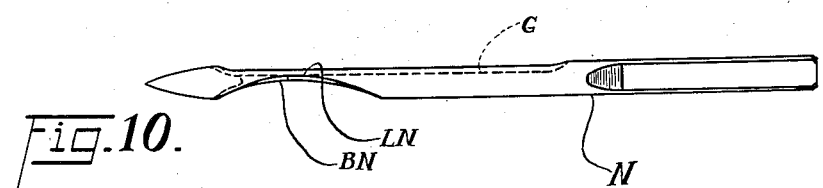
Figure 11:
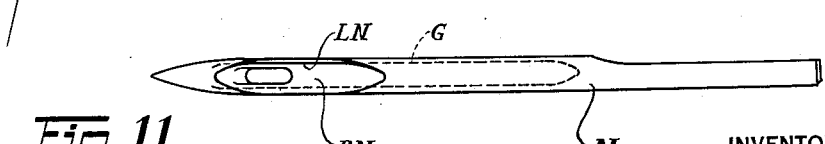

The invention consists of the various cooperating features specified in the claims, described fully and clearly hereinafter, and shown in the drawings of which Fig. 1 is a perspective showing plural sets of mechanisms on the two sides of the vertical base fabric in the multiple needle machine, said fabric being held taut in its vertical plane; Fig. 1 showing particularly a few of the many multiple sets of mechanisms permissibly hundreds in number, on the pile-forming or loop-cutting side of the completed pile fabric, facing the observer, these being some of the features of particular novelty herein, and arranged for cooperation with the mechanisms including the yarn or thread-carriers or needles multiplied correspondingly on the other or needle side of the fabric, i. e. in rear of the fabric in Fig. 1 for cooperation respectively with the sets of mechanism shown in Fig. 1 in front of the fabric;

Fig. 2 is an approximately full scale perspective looking generally toward the same side of the machine as is Fig. 1, i. e. toward the pile carrying surface of the base-fabric (omitted for clearness), but Fig. 2 being taken from a different angle than Fig. 1 and showing one of the sets of pile-forming mechanisms on the pile surface of the fabric which are shown in Fig. 1 in multiple one for each needle in the preferred multiple-needle arrangement of Fig. 1;

Fig. 3 is a like-scale perspective of the parts in Fig. 2, i. e., on the pile-side of the base-fabric, but looking from the opposite or needle side of the machine, the base-fabric here being omitted in order to provide a view of this side of the parts shown also in Fig. 2;

Fig. 4 is a perspective in greatly reduced scale of substantially the same portion of the machine as in Fig. 1 but from the opposite or needle side of the base-fabric F and showing a few of the many multiple sets of mechanisms including the needles which cooperate with the pile-forming mechanisms on the pile-surface and shown in Figs. 1–2; one set of the new pile-forming mechanisms on the opposite or pile side of the base-fabric being shown in Fig. 4 at upper left where the base-fabric is cut away to show it;

Fig. 5 is a transverse section, enlarged relative to Fig. 4, and about three-quarter scale and partly in elevation, of that small portion of the entire machine which includes one of the complete sets of mechanisms on both sides of the vertical base-fabric F, showing the various co-operating mechanisms in their positions corresponding to the "home" position of one of the multiple thread-carriers or needles N, i. e., the needle in Fig. 5 having been withdrawn rightward to the furthest extent from base-fabric F at its position of rest at home;

Fig. 5A is a perspective, in the same scale as Fig. 5, showing certain of the mechanisms in the same condition and relations as in Fig. 5 corresponding with the home position of the needle N, but looking from the pile side of fabric F, (same side as Figs. 1–2), and downwardly to show the needle N on one side of F and two of the pile-forming mechanisms i. e., LH and K, on the other or pile side; the mechanisms 241, 241a and 131 of Fig. 5 being omitted from Fig. 5A for clearness in showing the cut loops CL projecting toward the observer from fabric F;

Figs. 6–8 show the loop-cutting knife K and its support, Fig. 6 showing the support, Fig. 7 the knife-blade and Fig. 8 the assembly of the two; and Figs. 9–11 shows the specially constructed thread-carrier or needle N, Fig. 9 being a side elevation showing the needle, its support and the thread-groove G formed longitudinally in the needle to receive the yarn-thread Y as above in Fig. 5; Fig. 10 being a bottom-up plan of needle N showing both the large and small adjacent needle-notches for cooperating with loop-holder LH, and Fig. 11 is a side elevation of N upside-down showing said two adjacent notches on one side of the needle adjacent its eye, which notches are engaged by the point of the spur of loop-holder LH as the latter moves up, Fig. 5, to pass thru a thread-loop which has been projected by the needle thru a mesh of base-fabric F.

Figure 12:
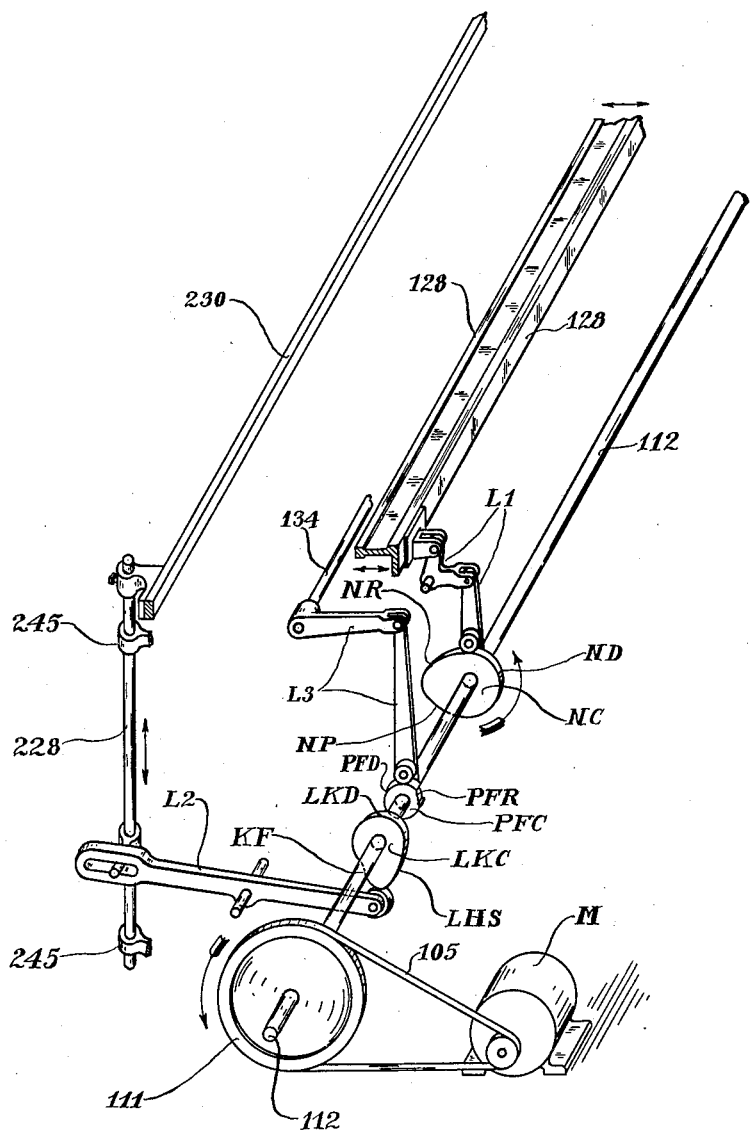

Fig. 12 is a partially diagrammatic and perspective illustration of the mechanisms which impart the proper motions at the proper times to the movable elements of the plural groups of pile forming mechanisms.

All the parts of the complete machine as a whole which are not shown in the drawings hereof may be the same as shown in our said prior application, including the means for supporting base-fabric F in taut condition in its vertical plane, the mechanism for moving F edgewise mesh by mesh in that plane, and the power connections for operating all the movable mechanisms in the manner and relative times to be described, the novel cycle of operations being a feature of the present invention.

In operation, base-fabric F is moved edgewise in its vertical plane intermittently short distances, i. e., mesh by mesh in various directions in said plane as desired in order to present its various meshes lying successively adjacent one another in any direction in said plane, to the operation of the multiple sets of pile-forming mechanism including needles N. By means of the present invention, any desired pattern or design of any shapes and in various colors may be reproduced in the pile-fabric, and during said movements of fabric F, reproduced simultaneously in multiple on the same fabric or on different portions of each of multiple fabrics. Such movements of the base-fabric in its vertical plane may be caused either manually as by pantograph controlled by an operator, or automatically as by the usual perforated paper jacquard roll employed in multiple embroidery machines, and meanwhile there can be automatic operation of any desired number of selections of the hundreds of sets of pile-forming mechanisms hereof including the needles and loop-cutters which cause production of the pile-thread surface of the product such as rugs, etc. Two or more base-fabrics F may be employed face to face, for the purpose of increasing friction between the cut pile-threads and the fabric thereby holding said threads and fabric more securely together in the completed product, and/or making a rug of heavier body.

Each and all of the individual sets of pile-forming mechanism including their needles N and loop-holders LH and knives K, is fixedly supported as a whole, Figs. 1–4, so that when base-fabric F is moved in its vertical plane, fresh, open or empty meshes of F not theretofore filled with the pairs of pile-threads will be presented to the plurality of sets of pile-forming mechanisms at the proper times. The movements of the individual elements of each set of pile-forming mechanisms otherwise have nothing to do with the movements of base-fabric F in its vertical plane altho most of them are moving continuously in cycles, including the times of intermittent movements of F mesh-by-mesh thereof. The movements of the needle N of each set, however, are such as to keep the needles out of the meshes of fabric F at the times of successive movements of the fabric in its vertical plane.

The structure of the pile-fabric produced by the machine provided with the plurality of knives K, includes a multiplicity of independent U-shaped yarn-threads closely associated together. The two free ends of each of these U-threads project as pile-threads toward the observer of perspective Fig. 5A, from the surface of base-fabric F. The ends of one of such U-threads is shown at U1, U1. These ends extend from two separate meshes of base-fabric F which lie successively adjacent one another. These two pile-ends U1, U1 are connected together in the U-thread by the bottom or foot of the U. This foot is located on the other surface of fabric F, the rear side in Fig. 5A, i. e., the needle side, the right-hand side in Fig. 5. This foot of the U-thread never is cut but permanently holds together the two pile legs U1, U1. This foot lies flat along and close to the surface of F. (In Figs. 4 and 5, this foot occupies a position, during cutting by knife K, between one of the pressers 131 and the needle side of fabric F, the front side in Fig. 4.) The other pile-threads of the surface CL of Fig. 1 are illustrated for example at U2, U2, Fig. 5A. These two legs are parts of a U-shaped yarn-thread footed against the needle side of F just like U-thread U1, U1 and its connecting foot, and having similar relations to F. One leg U2 at left, of U-shaped thread U2, U2, extends alongside right-hand leg U1 of the first above described U-thread U1, U1; and said legs U2, U1 both extend thru the same mesh of F. The other leg U2, (right-hand leg of U-thread U2, U2), in Fig. 5A forms part of a loop L which has not been cut as yet, having just been projected thru a mesh of F at right by one of the plurality of needles N, this just-projected loop being held by loop-holder LH from being shortened by the retraction of N to right, Fig. 5. In Fig. 5A, this loop L is about to be cut by the sweep of inclined knife-blade K down thru the loop, which cuts outwardly thru the loop-head toward the observer of Fig. 5A. This cutting of loop L in two, establishes complete isolation of the U-shaped thread which includes legs or pile-ends U2, U2 and their connecting foot, from all connections save that with base-fabric F. A previous operation of K has cut off the left of U-thread U2, U2 from U-thread U1, U1 at left. Said last operation of K at right is to cut the right of U-thread U2, U2 from the right-hand leg of loop L which is to constitute the left-hand pile-thread of a succeeding U-thread at right of U-thread U2, U2. Thus each successive separate U-shaped thread including its connecting foot, is produced by two successive operations of knife K on two successive loops like L successively projected by N respectively thru two adjacent meshes of F; and the two legs of each loop L become adjacent pile-threads U1, U2 extending thru the same mesh of F but constituting the pile-threads of two separate but successive U-threads U1, U1 and U2, U2, each separately footed, Fig. 5, against the surface of F on its needle side. The right end U1 of the left U-thread U1, U1 in Fig. 5A, and the left end U2 of the right U-thread U2, U2, both extend thru the same given mesh of F; the left end U1 of U1, U1 extend thru a mesh at left of said given mesh; and the right-end U2 of U2, U2 extend thru a mesh at right of said given mesh, so that parts of two successive U-threads extend thru three successive meshes of F. And the feet of projected loops L are left, after loop-cutting on the needle side of F undisturbed by the cutting. One loop L is projected thru each mesh of F, and both legs of each loop extend thru the same mesh. The legs of each cut loop CL, as at U1, U2, Fig. 5A, lie close together as shown because they continue, after cutting, to extend thru the same mesh of F, just as the loop-feet are undisturbed by the cutting.

The two legs U1, U2 of two successive U-threads, which extend thru one mesh of F, are held in position inside said mesh, after cutting, by friction of their surfaces with one another and with the threads of the mesh. That friction is established by the small size of the mesh relative to the yarn-threads Y of loop L; altho the mesh is large enough to permit forcing thru it of both the loop L and the needle N of special construction to be described for the purpose of avoiding excessive over-all thickness of loop and needle. In perspective Fig. 5A the cut loops as shown diagrammatically are made to appear spaced apart relatively widely in order to facilitate understanding of the above construction, but actually such spacing does not exist and the pile-threads U1, U1, of two cut loops are separated from one another at their bases only by the mesh-thread and are in general contact with one another along their lengths extending beyond F; and so of pile-threads U2, U2; so that all the pile-threads are distributed substantially evenly over the surface of F and constitute the proper pile-surface of CL in Fig. 1.

In order to produce this pile-construction by the operation of the machine in which is supported base-fabric F movable in its vertical plane, and in order to cause each and every pile-thread to extend the same distance permanently from fabric F, we provide herein, among other cooperating improvements, novel means for preventing horizontal movement of portions of F outside the vertical plane during the pile-forming operations of the plural sets of mechanisms. Altho fabric F is supported in as taut condition as practicable in its vertical plane in the manner heretofore used in multiple-needle multiple-shuttle embroidering machines, and as in our said prior case, yet the forcing of hundreds of double thread yarn loops simultaneously thru each of hundreds of meshes of fabric F tends to swing the portions of the taut fabric horizontally along a horizontal line at right angles where the row or rows of needles are operating along said horizontal line between the top and bottom supports for the base-fabric F as a whole, so that F tends to swing first in one direction when the needles, distributed in a row horizontally of the fabric, are projecting the loops, and then to swing in the opposite direction while the needles are retracting rightwardly toward their "home" positions of Fig. 5; and the distances over which fabric F thus tends to swing would be so great, if not controlled, as to prevent the desired improved functioning of the elements of the duplicate pile-forming mechanisms other than the needles and cooperating therewith. Thus, irrespective of the pluralized devices for holding in proper positions for cutting, the distributed individual loops already projected by the distributed needles N, and in addition to such holding of such loops by loop-holders LH and knives K prior to and during loop-cutting, we provide novel means for holding fabric F itself horizontally stationary during the time when the loops already projected by N are being held successively by LH and K in proper positions for accurate cutting by K, the whole, including the novel means, serving to cause the production of a smooth pile surface consisting of equal cut lengths of loops. But the problem involved was not merely one of intermittently holding F laterally stationary at such times, (between the times when it is moved mesh-by-mesh in its vertical plane), but of providing such means for that purpose as would not cause interference by the mechanism on the pile side of F with the pile thread surface itself. No matter how short may be the projected loops and cut pile threads, the mechanism on the pile side of F necessarily is close enough to F on that side to operate on the loops for cutting them properly to produce pile-threads all of equal length and with clean cuts accurately made thru the projecting loop-heads, by knives K with inclined edges facing away from F and cutting outwardly thru the loop-heads; and the mechanisms which hold F on the pile side must engage the surface of F itself from which the loops and cut piles extend. It is this problem which was involved in the present invention for the purpose of facility and insuring the production of accurate work particularly in cases of designs desirably in colors involving curves as distinguished from "square work", i. e., in cases where F is moved in curved lines instead of in vertically and horizontally straight lines constituting square-working.

Thus certain of the improvements hereof are of more particular utility in connection with the production of single-thread pile-fabrics in any desired designs and of any desired variation of coloring, the bobbins A, Fig. 4, being provided respectively with yarn or thread of the colors desired to be supplied to the many duplicate sets of pile-forming mechanisms which may be operating on particular portions of vertical base-fabric F after it has been moved in its own plane.

The improvements hereof are adapted particularly to the production of floor-coverings such as rugs and mats of any size no matter how small, and large enough, if desired, to be considered carpets; but the principles of the improvements may be employed in machines for the production of various other pile fabrics or even uncut loop fabrics wherein the pile-threads or the uncut loops may be longer or shorter than those suitable for floor-coverings, or even loop-surface rugs or floor coverings of the type known as hook-rugs.

The multiple pile-forming mechanisms are located in one or more horizontal rows, Figs. 1 and 4, from end to end of the machine which may be of the order of forty feet long more or less, base-fabric F having a corresponding horizontal length, and the machines having a height of the order of ten feet or more; and if desired, two or more separate base-fabrics F may be supported vertically one above another in taut condition one above another in the same vertical plane, and such two fabrics be operated on simultaneously by two horizontal rows of groups of the pile-forming mechanisms; a plurality of pile-surface rugs being produced simultaneously on each base-fabric. After completion of pile-forming the base fabric is cut between the adjacent rugs to separate them.

In each set of pile-forming mechanisms, the parts on the needle-side of base-fabric F, lie generally opposite the parts of the set on the pile-side.

The plural sets or groups are located as close together in a horizontal row or rows as practicable, usually about two or three inches apart, more or less, i. e. about two or three inches between successive needles. But as will be seen, it is not necessary in all cases, that all the plural sets always shall operate at the same time. That will depend upon the nature of the color or curvatures of the design to be made, as will be described.

In making floor coverings such as rugs by our machine there are employed, for even small rugs, a plurality of the sets of pile-forming mechanism for each rug, and a large number of such small rugs can be made simultaneously in the same machine, each by the large number of simultaneously operating sets of mechanisms, so that production is at a very high rate indeed. An object of the present invention is to produce rugs, etc., including any desired curved and/or color designs at high rates and with uniform accuracy, and with minimum subsequent hand labor on the products and loss of time.

The parts of each set of pile-forming mechanism which are on the pile side, Fig. 1, of the machine and base-fabric F, other than LH and K are supported on stationary metal member 244 which extends horizontally and usually the entire length of the machine alongside fabric F, this support 244 itself being fixedly supported at successive portions of its length in the general frame of the machine which movably supports base-fabric F and the various power-driven parts of the machine.

The parts of each set of pile-forming mechanism which are on the needle side, Fig. 4, of the machine, include horizontally reciprocating needles N and swinging presser-fingers 131. Each horizontal row of needles N is mounted on needle-bar 128 as a needle-support which extends, Fig. 4, horizontally of the length of the machine along base-fabric F; support 128 being reciprocable to and from F to carry loops of yarn from feed-roll 172, Fig. 4, successively thru the successively adjacent meshes of F, intermittently between the time when F, Fig. 5, is moved mesh-by-mesh in its vertical plane. Each horizontal row of presser-fingers 131, one for each needle and set of the rest of the pile-forming mechanisms, is reciprocably swung by a rock-shaft 134, Fig. 4, to which the fingers are fixed, shaft 134 extending horizontally of the length of the machine along base-fabric F paralleling horizontally long needle-support 128. Bolts 133 hold the lower ends of fingers 131 to rock-shaft 134 the movements of which latter are timed for the very important function of these fingers, cooperating with other elements to be described, in insuring clean cutting of each loop by knife K into equal pile-threads. That is, knife K starts to cut a thread-loop projected thru F by needle N, a certain time after shaft 134 in rocking toward F has moved finger 131 against F to move the latter slightly leftwardly against nose 241a of fabric-support 241 on the pile-side, so that the fabric and the projected loop thereafter are held laterally immovable in a direction between 131 and 241a, particularly during the loop-cutting operation. Following is a much condensed description of operations. As shown, Fig. 4, each finger 131 preferably is forked at its upper free end, the needle and thread-loop are projected thru the lower end of the slot forming the tines of the fork, the needle and loop then passing thru the mesh of F, and during the cutting thru the loop-head by knife K the latter is prevented from pulling the loop away from the pile side of F by the engagement of the flat tines of fork 131 on the needle side of F against the foot, Fig. 5A, of the loop being cut, pressing said loop-foot leftwardly against F which itself is clamped between 131 and 241a to hold it from lateral broadside horizontal movement by needle N in a direction further leftward; for during this cutting cycle of K, altho after its cutting operation, a loop L, Fig. 5, already projected by a previous needle-operation, the needle is carrying a succeeding loop thru an adjacent mesh of F. In Fig. 5, the needle N is "home" at right, and LH and K are just starting to go down from the position shown in Fig. 5 wherein LH is holding the loop L in the position furthest to left when the loop L was projected by the preceding leftward movement of N. In this position of LH in Fig. 5 it holds loop L fully distended to left of F because the horizontally widest portion of the pointed spur of LH is in vertical position fully engaging the inside of the loop-head. (N pauses and stays home at right for about fifty per cent of the cycle of vertical reciprocation for LH and K. Also LH and K move down at a higher rate than they go up, because cutting is done by K as it goes down, and for clean cutting a high rate of movement of K produces best results, i. e. complete freedom from unsightly fuzz or fluff of the ends of the pile-threads U1, U2.) As LH and K move further down from their positions in Fig. 5, and as the horizontally wider portion of spur LH starts to move down out of the inside of the head of loop L, the pointed lower end of inclined blade edge of K engages the inside of the loop head preliminary to cutting, replacing LH as the means holding loop L fully distended during cutting until cutting is completed. During all this time, presser-fingers 131 have held F clamped against stationary clamping nose 241a. But fingers 131 move rightward away from F just after loop-cutting by K and when LH and K are more or less near the bottom of their downward vertical stroke. LH and K pause at the bottom of their stroke, and while then pausing, and with 131 to right away from F, the latter is moved in its vertical plane, just before N starts leftward to project the next loop. LH and K start their upward return movement (after said pause at bottom this return being at a rate slower than their downward movement), while F is being moved in its vertical plane, i. e., during the latter portion of the movement of F over the total distance of one loop. Needle N starts leftward from its position of rest in Fig. 5, at about the same time that LH and K start moving upward, and 131 moves left to clamp F against 241a just before N moving left reaches F. The loop on N is projected fully leftward beyond F, and then N immediately starts rightward, and just about as it has moved $\frac{1}{16}$ inch rightward, it reaches the horizontal position crossing the upward path of LH. At this instant LH in its upward movement reaches the horizontal path of the needle, and thereupon the point of LH enters the loop passing up along notches LN and BN in the needle. The slower upward movement of LH, (than its downward rate), is useful in insuring that its point passes upward thru the projected loop L while on N. As N continues rightward 131 continues clamping and holding the foot of loop L pressed tightly against F so that the loop is held fully distended to left while the point of LH moves above the loop and the wider portion of LH moves up fully inside the loop-head to the position of Fig. 5 when LH cooperates with 131 in holding the loop fully distended. LH and K reach the top of their vertical stroke just before N reaches its home position of Fig. 5; and then LH and K immediately start to go down as before, during the pause of N at right.

Thus the cutting of the first-formed loop L, Fig. 5, is effected by K during the faster downward movement of LH and K and when N is home at right, Fig. 5; and the projection of the next loop is effected during the slower upward movement of LH and K. It is this complete cycle of LH and K which takes less than one-half second. And presser-finger 131 clamps F against stationary nose 241a from a time just before N starts to move thru F until the cutting of first loop L is completed, i. e., 131 is not moved rightward until just after cutting of L by K is completed, either just before LH and K reach the bottom of their stroke or during their pause at that stage; 131 again moving left to clamp F against stationary nose 241a just after LH and K have started to move upward, and after F has been moved in its vertical plane and just before N re-enters F to project the next loop.

The holding of the foot of the loop L being cut, Figs. 5, 5A, is effected by the arrangement shown wherein, at an instant later than that illustrated in Fig. 5, and when the needle is about to move leftward thru F to project the next loop, the clamping of F between 131 and 241a is timed not only as above, to insure proper cutting immediately afterward of the loop L shown as already formed but not cut, but also to insure projection by the needle of the next loop of proper length to left beyond F by holding F stationary in the direction of horizontal needle-movement, all so that a single operation of finger 131 against F simultaneously insures (1) accurate cutting of loop L formed by the previous reciprocation of the needle, and also (2) insures accurate formation of the next succeeding adjacent loop, all of which goes to the production of a smooth pile surface lacking all pile-threads longer or shorter than the intended length, i. e., with all pile-threads of exactly the same length.

Clamping nose 241a of support 241, and support 241 itself and its arrangement with nose 241a, are all of the utmost importance in our machine, because they jointly act to participate in the above two functions of holding fabric F against lateral broadside movement (and movement in its vertical plane) and of holding the loops in proper position for accurate cutting. The clamping-nose 241a is positioned, Fig. 5, so that when F is being moved in its vertical plane, 241a, which is operatively stationary, lies slightly spaced from F, thereby leaving F free for its said movement. Also nose 241a is so fixed relative to finger 131 on the needle side of F, that the portion of fabric F which is pushed against nose 241a by presser 131 is the portion of F which lies against 131 below the bottom of the vertical slot in 131, Fig. 4, the needle and loop during projection thru F passing just above, i. e., thru the lower portion of said slot, between the tines of fork 131. The flat tines of forked-finger 131 which cooperate in the cutting operation, press against fabric F, the feet of various loops in the vicinity including the foot of the loop which is being cut while the next loop is being projected; one of the tines extending sufficiently far horizontally, Fig. 4, to grip the foot of the particular loop L last projected, and about to be and being cut, said grip being at a portion of that foot which is close to the portions of the doubled threads which extend thru the mesh of F. The flat faces of 131 which grip the surface of F and the loop-feet are knurled or serrated at 286, as shown in Fig. 1, right, for most effective gripping of 131 to clamp against 241a. While presser 131 need not be forked (but may have only a hole for loop-projecting passage of needle and thread-loop) yet the forked form shown is preferable because of providing for easy threading, the thread being passed down thru the open top of the seat.

Knife K and their cooperating loop-holders LH are reciprocated vertically by means, for example, Fig. 5, of the vertically reciprocated rods 228 which correspondingly move the support 230 to which K and LH are fixed as shown.

The function of LH is to hold each loop in proper horizontal position after its projection by a needle until K moving down starts to enter the loop-head between the loop-legs in preparing to sever the loop into two pile-threads. Then LH moves down out of the loop and K replaces LH inside the loop holding the latter in proper horizontal position during the cutting operation and until cutting is completed. Knife K has its cutting edge directed away from F and inclined as shown so that as the knife as a whole moves straight down following LH which it overlaps, the knife-edge reaches the inside of the head of the loop before LH leaves the latter so that there is no interruption in loop-holding, K instantly assuming the loop-holding function of LH as the latter starts to move down out of the loop; and thereafter as K moves down further, the cutting and loop-holding of K continue until completion of loop-cutting. Loop-holder LH holds the loop from the time the latter first is projected completely thru F by a needle, holding the loop from retraction by the needle as the latter goes back rightwardly to its home position of Fig. 5. K starts back upward after having severed its loop L, and as it goes up the projection of the next loop by N is completed; and as LH goes up with K it enters the just-completed new loop, preventing shortening thereof by the pending rightward retraction of the needle, and holding the loop in constant length after the needle has gone to rest at right and until K comes down to cut it. (While knives K can be omitted in the production of loop-surface fabrics, yet they or equivalent cutting means are essential in the production of cut loop pile-fabrics.)

LH in entering between the legs of a projected loop, passes between one leg of the loop and the needle. To cause this operation the upper end of LH is pointed as a spur, Fig. 5, and the needle N, Fig. 9, is notched at its side along which LH moves vertically, at BN, Fig. 9; this notched side of needle N being the side opposite to that shown in Fig. 5; (the needle side in Fig. 5 is shown in Fig. 9 at G); and LH moves up thru this notch BN close to the curve of the same so as to pass between the needle and the loop-thread-leg extending longitudinally from the eye near the point of the needle back along the needle in a curved line following the generally curved configuration of the needle, the thread bridging across notch BN, forming a little free space between the thread of the loop-leg and the curve of notch BN, thru which space the pointed end of LH can pass. Thus the passage of LH is facilitated between the needle and the loop-leg which bridges notch BN, while the other loop-leg extends along the longitudinal groove G in the opposite side of the needle, Figs. 10 and 5; said groove G acting to prevent an undue stress on the threads of the mesh of fabric F as the needle projects the loop thru such mesh, the groove G serving to reduce the over-all thickness of needle and looped yarn-thread extending thru the mesh. But the greatest accuracy of operation is necessary in our machine, in order to insure against LH missing entering the loop, between the needle-notch BN and the adjacent loop-leg, which would result in a permanent short loop not cut to form pile-threads or in too short cut pile-threads. To prevent such mischance, serious in causing an imperfect or unsightly product, the lower edge of notch BN is cut at an angle, at LN, Fig. 9. This permits LH to be mounted in such position, i. e., with the vertical path of the point of its spur so close to the center of the width of the needle, that said pointed end of LH is certain to move upwardly in close contact with the curve of notch BN thereby certainly passing between the loop-leg and the needle; i. e., LH is set in position for such vertical path that as it moves up, its pointed end first engaged with little notch LN, rather than miss entering the loop and as both steel parts LH and N have a little resilience altho of themselves stiff, the little notch LN guides the point of LH, flexing it in a direction toward the big notch BN and toward the center of the width of the needle and to a slight extent away from the portion of the loop-leg which bridges big notch BN; both steel parts LH and N having sufficient resilience to permit this and to hold them in close contact with one another so that the point of LH does not cut into the loop-leg but passes between it and N. This construction is substantially as effective in practice as if LH passed thru the center of the width of N mid-way of the two loop-legs.

At the time LH passes up thru a loop, the feet U1, U2, Fig. 5A, of the latter extending in opposite directions toward adjacent meshes of F on the needle side thereof, are held pressed against F by 131.

In fact 131 is held pressed against F, pressing F against stationary nose 241a, and therefore holding F against broadside movement particularly during loop-cutting, at all times while the needle is moving in or out of a mesh of F, (and just before the needles enter F and just after they leave it), and during all stages of operation of LH and K except that brief time just before the positions shown in Fig. 5, i. e., while (during retraction of needles to "home" position of Fig. 5) LH holds a just-formed loop L to proper length. Thereafter, as in Fig. 5, K holds the loop L distended until completion of cutting; but also during this time of cutting F is held clamped between 131 and stationary nose 241a.

The movement of base-fabric F in its vertical plane to present a new plurality of empty meshes to the action of the pile-forming mechanisms occurs only during the brief times just before the Fig. 5 positions, when F is not clamped between the multiplicity of stationary noses 241a and presser fingers 131, and when the needles are out of engagement with base-fabric F. In fact such clamping action between the many pairs of fingers 131 and stationary noses 241a serves as a brake on tendencies of F to be moved in its vertical plane when the needles are moving to and from and thru the meshes of F; for the forces tending so to move F may be applied continuously, and are so applied by manual operation of the pantograph, the operation of which continuously exerts a gentle pressure just sufficient to move F in the condition of the parts in Fig. 5 when 241a, 131 and N are out of engagement with fabric F.

The complete cycle of operations occupies less than one half second of time, i. e., the cycle of operations of parts 131, N, LH and K in cooperation with stationary supporting or clamping nose 241a; this cycle involving the cutting by K of one set of loops L, Fig. 5, previously formed, and the projection of another set of loops (to be cut during the next cycle) during the latter portion of the same cycle of operations. Thus each of the many needles project two loops per second and each of the knives cuts two loops per second, producing four cut pile threads per second for each of the plural sets of pile-forming mechanisms. Greatly improved uniformity of accuracy at such high speeds is the result of the solution of the problem by the present invention.

Further important construction and cooperation of needles N, loop-holders LH and knives K are as follows, Fig. 5. The ends of LH and K overlap vertically, and the steel blade K is resilient and mounted at its upper end in such position that, Fig. 5A, it is flexed slightly in its normal condition when its lower pointed end is spring-pressed against LH by the inherent resilience of blade K itself; the lower pointed end being lodged inside notch 236 of LH whereby the pointed end of K is held in position wherein it cannot engage with and tear the adjacent loop-leg thread as K follows LH down to take over the duty of holding the loop in fully projected condition leftwardly of F. Thus during the greater part of each cycle of operations, LH and K act as a single vertically long member so that in their downward movement when LH is retracted from the loop, then K succeeds it. But at a proper time during the upward movement of LH, after the downward movement of LH and K to cut a previously projected loop, the needle N projects the next loop into the upward path of LH, the head of this new loop being projected sufficiently leftward of said path of LH to cause notches BN, LN in the needle to lie in the upward path of LH as the latter reaches the level of the loop, so that the point of LH can pass thru notch BN and one loop-leg as above, so that before the needle goes back rightwardly toward home so far as to shorten the loop, LH will be moved far enough up so that the lower and wider portion of its spur passes between the loop-legs inside the loop-head so as to hold the loop from such shortening. But in this operation of LH the horizontal movements of the needle enter into relation with the upward vertical movement of knife K. Thus as K and LH move up, N passes horizontally across the flat face of resilient blade K, while the latter moves up along one side of N, the timing and loop-penetrating actions of LH being as above. The side of N against which K engages is the side opposite to needle-notches BN, LN engaged by LH, i. e., the side of N having the longitudinal thread-groove G, Figs. 10 and 5. So, Fig. 5A, as LH moves up toward N to pass along the left side of N formed with notches LN, BN, the lower end of K, overlapping with and pressing against LH, simultaneously moves up, its flat face engages against the right side of the needle, and its further upward movement abutting the needle flexes the lower end of the blade moving its point out of recess 236 in LH leaving LH free to enter the loop on the needle as first above described. When LH has passed up thru the loop, its recess 236 lies above the loop, and by that time the needle and the lower end of K have moved away from one another so that the point of K springs back into recess 236 of LH. If it were not for the above arrangement, the knife would prevent the penetration of the loop by LH because the normal position of the lower end of the knife is in the paths of both LH and the needle. Actually in the above clearance of LH, N and K, the parts LH and K move upwardly on opposite sides of N; but the effect on the flexing of K is as if N moved down along the flat blade K and between LH and K. After LH and K have moved up so that K springs back against LH, these parts are in their proper normal overlapping relation for downward cutting movement by K, while the needle is resting at home at right, Fig. 5, during which downward movement K passes thru the loop following LH, and K and LH execute their successive operations of loop-holding, and K performs the cutting operation, the contact between them permitting K to follow LH down thru the loop at which time N is in position of rest at home at right.

The operations, summed up, of the various elements of each of the multiple pile-forming mechanisms on the two sides of base-fabric F, are as follows, after F has been moved in its vertical plane just before the elements have reached their positions of the parts shown in Fig. 5, needle N pausing an appreciable altho short time in its home position at right, Fig. 5. The presser-finger 131 has remained in its position away from F, to right of its position of Fig. 5, during the time F was moved by one mesh in the desired direction in its vertical plane; this finger 131 having been moved rightward away from F just after completion of cutting of a loop and after, subsequently to cutting, N had left F in the rightward movement of N toward its home position of Fig. 5. That is, 131 had left F to right approximately when LH and K paused at (after cutting) the bottom of their downward stroke, preferably just before they reach the end of said stroke. And 131 again has clamped F and the loop-foot against 241a before LH entered the just-projected loop L on needle N. In Fig. 5 therefore, LH and K have just started or are just about to start downward, N is pausing at home, and finger 131 has been moved leftward to press F against stationary nose 241a, and the foot of loop L against F, in preparation for the cutting of previously formed loop L by the next downward movement of K which in Fig. 5 is about to commence. Thus, from and after the Fig. 5 positions, with finger 131 remaining in operative position shown against F, and the loop foot, then LH and K move down or further down for cutting by K of previously formed loop L, while needle N remains home at right as in Fig. 5 throughout said cutting. Needle N starts its leftward movement in preparation for starting projection of the next loop thru F, just after LH and K have started upward from their pause at the bottom of their downward stroke. During the downward movement of LH and K as a continuously acting composite loop-holding element for previously formed loop L, K enters L from above as LH starts to move below and out of L, and K and 131 hold L during its cutting of L and until completion of such cutting. During this downward movement of LH and K, needle N is yet pausing at right in home position of Fig. 5. And during all this time, finger 131 stays in the position shown, Fig. 5, pressing F against stationary nose 241a, and the foot of the loop against F, in which position 131 remains until the instant later on, when K has moved far enough down to complete the cutting of L; 131 having moved leftward to said clamping position shown in Fig. 5 just before needle N in its leftward movement has reached F. The loop being cut by K is prevented from being pulled out of F by K more or less, as the inclined edge of K tends to pull the loop out as it does down,—by means of the pressure of the serrated surface of 131 against the feet of the loops lying on the needle side of the fabric. Also 131 and 241a hold F horizontally stationary (and cooperate with needles N in holding F vertically stationary against the tendency caused by the pantograph operation) during the passage of needle N in both directions horizontally to, from and thru F. The above is the complete cycle taking place in about one-half second, during which one loop is held and cut and a succeeding loop is projected and held in preparation for cutting; each cycle including complete horizontal reciprocation of N and 131 on the needle side of F, and complete vertical reciprocations of LH and K on the pile side of F; nose 241a being operatively stationary at all times. Such brief cycles follow one another continuously, base-fabric F being moved intermittently in its vertical plane in the very short time while the parts are in the positions just after those shown in Fig. 5.

The above describes the operations of presser 131, needle N, loop-holder LH and knife K in relation to the other elements shown in Figs. 1–3 and including particularly the operatively stationary members 241 and 241a forming a portion thereof. Also the mountings of all said parts save 241 have been described above. In the present invention not only have the needles and the knives been improved in construction for cooperative working but the important member 241a has been combined in an improved manner with the rest of the elements of the sets of pile-forming mechanisms; altho as before in our prior case, 241a cooperates with reciprocating presser-finger 131. In our said former case the nose 241a was supported by a means which was reciprocated (rocked) to and from base-fabric F for cooperation with finger 131. Here, however, Figs. 1–3, among other features of improvement, nose 241a is stationary while in use for cooperation with finger 131 in (1) supporting base-fabric F in proper vertical position against both horizontal and untimely vertical movement, and (2) in permitting finger 131 to hold against the needle side of F, the foot of a loop projected but not yet cut, for the purpose of preventing shortening of the adjacent pile-thread and consequent elongation of the loop during the cutting operation by the downward movement of knife K which, Fig. 5, for the purpose of cutting, is inclined in a direction which tends to pull the loop out away from F; another important function of 241a and 241 being to support a projected uncut loop in proper horizontal condition prior to and during cutting. But altho nose 241a thus is operatively stationary, it is formed as a part of a structure which is movable manually, Figs. 1–3, into inoperative position for a purpose to be described in connection with Figs. 1–3 as follows, Fig. 1 showing five of the many sets of those portions of the pile-forming mechanism which are located in a horizontal row on the pile side of base-fabric F. The parts about to be described are operatively stationary and carried by stationary support 244, Fig. 1.

In Fig. 1 at right the fabric is shown as cut away in order to show the parts on the other (needle) side, including the presser-fingers 131 and the multiple-needle-support 128.

In Fig. 2 the fabric-supporting clamping nose 241a is shown in stationary operative position as is shown in Fig. 5, i. e., base-fabric F being pressed against 241a by presser finger 131, which has been moved by its rock-shaft 134, Fig. 4, to move F leftward, Fig. 5, against stationary nose 241a. This is the situation wherein, as above, the finger 131 clamps against clamped fabric F the foot of a projected loop until after the loop has been cut by K.

Nose 241a is at the end of pivoted arm 241 which here is substituted as a fabric clamp and loop support for the correspondingly numbered member 241 of our prior case. Fig. 3 shows pivoted arm 241 carrying nose 241a in its other stationary position where it is inoperative and to which it has been swung on its pivot manually as by screwdriver in its top slot 285. In Fig. 1, in the five sets of pile-forming apparatus shown from left to right, member 241 is in its inoperative position of Fig. 3, in the second, third and fifth sets from the left, and is in its operative position of Fig. 2 in the first and fourth sets from the left, for a purpose to be described.

Support 241 is swung manually on the upper end of a vertical pintle 243, as distinguished from the mounting of nose-carrying member 241 on a horizontal power-oscillated rock-shaft as in our former case.

Vertical pintle 243, Figs. 2–3, is journaled (to provide a long bearing for accuracy in alining nose 241a in operative position of Fig. 2), in two horizontal legs 238, 238a extending from main vertical support 271 which carries fabric and loop support 241 and other novel features to be described,—support 271 being one of a group of several supports in each set for the various elements of each set of pile-forming mechanisms which are grouped about needle N and knife K; said supports additional to 271 being needle-carrier 128, Figs. 1, 4 and 12; rock-shaft 134, Figs. 4 and 12, for presser-fingers 131, Figs. 4 and 1; and vertically reciprocating rod 228, Fig. 5, and the common carrier 230 thereon, Figs. 5, 12 and 1, for knife K and loop-holder LH.

Figs. 2 and 3 show support 271 and its accessories more clearly than Fig. 1 which shows also the supports 230 for the knives K and loop holders LH.

In Fig. 2 said support 230 is omitted for clearness but a loop-holder LH, a knife K and a needle N are shown in order to illustrate the operative relations to them of nose 241a, its support 241 and the other parts also supported by support 271 of Figs. 2–3.

Fig. 3 for clearness shows nothing but carrier 271, its accessories and main long horizontal support 244 on which a row of carriers 271 is fixed. Each carrier 271 for one 241 and 241a is formed with a foot 275 which is bolted to long horizontal support 244.

In Fig. 2, vertical pintle 243 is shown as formed at 272 with two flat portions at opposite sides. Nose-carrier 241 is fixed to pintle 243, rests on and swings over the top of main vertical standard on support 271. This, Fig. 3, is engaged by the upper end of a leaf spring 273 secured at 274 to lower lug 238a of support 271. This spring 273 acting against said two flat portions 272 of pintle 243, holds the pintle and the nose-carrier 241 and its nose 241a in their operating positions, Figs. 2 and 5, and in their inoperative positions of Fig. 3. A small horizontal pin 289 is fixed in pintle 243 as a stop as follows. Pin 289 along its length contacts with the bottom surface of lower lug 238a so that top member 241 and pintle 243 to which 241 is fixed, cannot be lifted out of the bearings of 243 in lugs 238, 238a during the operation of the machine or otherwise. Also the extent of pin 289 beyond the opposite sides of pintle 243 is such that the ends of the pin engage, as stops, against the vertical surface of standard 271, in both positions of nose-carrier 241 to which the latter is movable on its pintle 243; one end of pin 289 being particularly relied on to cooperate with spring 273 and one flat face 272 of pintle 243, in holding nose-carrier 241 in its inoperative position. Nose-carrier 241 is fixed to pintle 243. Carrier 241 rests on top of main standard or vertical support 271, and 241 swings over the upper surface of 271.

A vertical guard or protector 276, Figs. 1–3, of sheet metal but stiff enough, is secured at one of its vertical edges to that vertical side of standard or support 271 which faces the pile side of base-fabric F. This vertical guard 276 is horizontally curved. Its convex side faces the pile side of F. In the curvature of its concave side, Fig. 2, the loop-holder LH and knife K reciprocate up and down.

This guard 276 intervenes between uncut loops and completed pile-threads and LH and K for a purpose to be described.

Nose-carrier 241 is formed with a notch 277, Fig. 3. When 241 is swung clockwise in the direction of the arrow, Fig. 3, back to its operative position of Fig. 2, and spring 273 impels it to move nose 241a to operative position adjacent fabric F, Fig. 5, the notched portion 277 of 241 engages stop 278 formed on the upper end of 271 and determining operative position.

Nose-carrier 241, Fig. 3, is formed with a curved portion 279, Fig. 2, above guard 276. This portion has the same curvature as guard 276. When 241 is swung to its Fig. 2 operative position and there stopped by 278 and pin 289, the position of rest of curved portion 279 is directly above guard 276, Fig. 2, so that this curved portion 279 of nose-carrier 241 serves as an upper extension of guard 276, so that LH and K reciprocate vertically in paths guarded by 276 and 241 up to the level where, Fig. 2, needle N passes over the upper surface of nose 241a.

As shown most clearly in Figs. 6–8, the knife-holder 232 is forked at 280, Fig. 8 for securing to its support 230, Fig. 5, by bolt 233. Also the other end of holder 232 is formed with a depressed surface 281, Fig. 8, bounded at right by a straight abutment wall 282 located at an angle. Knife K itself also is forked at its upper end, at 283. The walls of the slot between the forks 283 are parallel to the right hand side of the knife, Fig. 7. Fig. 8 shows how, with a single screw 284 loose thru depressed portion 281 of knife-holder 232, the walls of the slot between the tines 283 of the forked upper end of the knife move along the single screw 284 as the parallel right hand side of the knife slides along abutment wall 282 which determines the proper angle of K, Fig. 5, relative to LH, L, N and F, for cutting by K; the knife being held in the depressed portion of its holder 232 in its proper operating angular position, by the cooperation of tightened single screw 284 and the abutment wall 282.

Noses 241a have, as the result of their nose-end-shapes, very small, altho blunt, areas in non-penetrating engagement with fabric F, at points distributed in horizontal succession along F, and respectively opposite forked pressers 131 at parts thereof just below the respective needles N and the presser-tines, Figs. 4 and 5. Needle N in projecting a loop thru F, moves horizontally just above the flat top surface 241B of 241a, Figs. 1 and 2. Said flat top surface 241B widens, Fig. 2, transversely of the path of N from nose 241a across 241 to the curved top guard portion 279 of 241. This continuous flat top surface 241B of 241a and 241, of substantial length in the direction of loop projection by N, constitutes a horizontal support for a projected loop preventing downward movement of the loop by gravity (sagging) from the time N (with F clamped between 241a and 131), starts to return rightwardly home and leaves the loop in projected position, at least until cutting of the same has been completed by K. In fact, the broad horizontal continuous flat surface 241B of 241a and 241 just below the path of N across it constitutes a support for a projected loop said support cooperating with LH in holding the loop up in horizontally distended position, Fig. 5 in preparation of cutting. But the most important duty of said flat top surface 241B of loop support 241 and nose 241a is just after LH and K start to move down from their Fig. 5 positions; for said surface 241B then holds the loop up from following LH down, and holds the loop up in position so that the left cutting edge of K will engage more nearly exactly in the inside of the center of the loop-head; and said surface 241B continues during the cutting operation to prevent the loop from being moved down by the downward movement of K after the latter engages the loop-head and during the completion of cutting, so that K before and during cutting thereby is assisted in keeping the loops fully distended by pulling it from the clamped loop-foot.

In the described construction and arrangement of support 241 for F and loop L, 241 is held rigidly in its operative position of Fig. 2, (by spring 273 pressing pintle 243 and thereby support 241 against stop 278) with nose 241a close to F when 131 is in its right hand position temporarily spaced from the needle side of F; and only a slight movement of 131 by its rock-shaft 134 is needed to move F against nose 241a. That is, 241 and 241a are held rigidly in the proper alinement of 241a with the portion of finger 131 just below needle N and the bottom of the needle-slot in 131, without disturbance by the high-speed operations of the needle strokes or the rocking of presser-fingers 131. Also, after 241, 241a have been swung manually from their operative Fig. 2 positions to the inoperative positions of Fig. 3, they are manually returnable accurately and always to their operative positions of Fig. 2 in alinement with 131 just below N and its slot in 131. On account of the stiffness of spring 273 and the consequent abruptness of movement of nose-carrier 241, it is preferred to provide the slot 285 for screw-driver in the top of 241 across its pivot-point.

In the inoperative Fig. 3 positions of support 241 for fabric and loop, all of its parts including nose 241a are spaced so far from F that they are not in contact with the ends of pile-threads formed thereon, and they can be put in this position, desirable at times now to be described, without disassembling or removing them from the machine, and can be restored to the operative positions of Fig. 2 merely by swinging pintle 243. Altho it is always desirable for high production rate to employ all the multiple sets of pile-forming mechanisms, including support 241, yet in the manufacture of products such as those including special curved or colored designs, it sometimes is necessary to operate with a smaller number of needles, etc. on a given product as a pile-rug. It is on such occasions that some of supports 241 are swung from the Fig. 2 operative position to the Fig. 3 inoperative position, i. e. when certain groups or sets of mechanisms are not to be used at a given stage of rug making operations, the members 241 of such groups are swung away from the pile surfaces of the rugs. For we have found that it always is desirable to have the space occupied by the pile-threads as free as possible from all mechanism, because the freer it is, the more nearly perfect the product will be, i. e. if fabric F and its pile surface are moved edgewise so that the pile surface is dragged across noses 241a then injury is done to said surface. It is for this reason that the disclosed construction of 241 and 241a irrespective of the swinging of member 241, is of special value because even in their operative positions of Fig. 2 there is a minimum vertical extent of 241 anywhere within the space or field occupied by pile-threads; that is, not only nose 241a but the parts of 241 adjacent it are quite thin vertically, being only sufficiently thick for strength to support nose 241a rigidly in alinement with 131 just below N; so that there are no parts in the space occupied by the pile-threads save only the multiplicity of small noses 241a and the vertically thin portion of 241 which supports 241a and extends horizontally out of the space or field occupied by the pile-threads. Hence when nose 241a itself is swung away from the pile-surface on F there is no portion whatsoever of member 241 which is left within the pile-field.

Also even the small-ended nose 241a when cooperating with finger 131 does not interfere with the pile-threads because when so operating the nose never lies against any point of base-fabric F save just below a mesh of F thru which a loop is being projected, and to one side of pile-threads of previously cut loops; said condition continuing always as fresh, empty meshes of F are presented by movements of F in any direction in its vertical plane, to needle N which always is in position above the portion of 131 opposite nose 241a.

In general, the above construction is adapted for the production of either "square work" or "curved work", square work being that wherein loops are projected successively in straight lines respectively horizontally and vertically of F; and curved work being that wherein loops are projected thru meshes of F which lie in curves for any desired pattern.

As above, the horizontally curved vertical guard in two parts 276, 279, has its convex side face-to-face with base-fabric F and the pile-threads extending therethru. This guard protects the previously formed pile surface from possible injury by the operation of LH and K in later formations of additional pile-threads. Nose 241a extends beyond curves 276, 279 toward F, Fig. 2, as a matter of necessity and, in normal working, without injury to pile-threads as above; and LH and K, Fig. 2, reciprocate up and down in the concavity of curves 276, 279, and as close as possible alongside the concave wall thereof; curved portion 279 of loop-support 241 being provided in order to permit such movements of LH and K, and particularly of LH, above needle N, Fig. 5, i. e. above the top end of main guard-portion 276. Thus the portion 279 of the vertical guard 276, 279, which is integral with nose-carrier 241, is a very special element combined with nose 241a and forming a part of the guard located directly below needle N. The location of the vertical plane of the entire guard 276, 279 is very critical, being as far away from base-fabric F as is possible, in consideration of the necessary freedom of operation of LH and K in the concavity of the guard which faces away from the pile-threads. The convex curvature of the guard which faces the pile-threads, Figs. 2 and 1, has a central portion nearest the base-fabric F, and this central portion of the vertical guard which is closest to F is substantially a vertical straight line which merely brushes along the ends of the pile-threads without injuring them. The vertical guard is so positioned relative to F that the distance of its said vertical line contact with the tip-ends of the pile-threads, is only slightly less than the lengths of said threads themselves from their cut ends to fabric F; so that as F is moved in its vertical plane to present fresh meshes to needle N, carrying previously formed pile-threads past the guard, the ends of such threads then pass easily across the central vertical line of the convex curvature of the stationary pile-guard but such thread-ends are kept by the guard from being repeatedly rubbed by LK and K in their high speed reciprocations of LH and K which would result in excessive fuzziness of the pile-thread ends. Then guard 276, 279, which is stationary and does not rub at high speed back and forth over the ends of the pile-threads, cooperates with the rest of the mechanism as above in improving ends of the pile-threads in the completed product. For in the lack of said guard, and altho the guard preferably extends only slightly into the thread-field, the ends of previously made pile-threads would not be lightly brushed aside but would extend straight out into the paths of LH and K. Thus the critical location of the guard is such, in the case of its designed location for any given length of pile-threads, that the straight line contact of the curved guard, itself does not injure ends of the threads as F is moved, while the guard positively protects them from injury by LH or K. All portions of stationary guard 276, 279 lie substantially further from base-fabric F than the lower portions of the vertical fabric supports 241 of our said prior case, wherein said supports not only extended vertically but were moved by a rock-shaft to and from base-fabric F, so that the portions of said prior members 241 were undesirably close to F even when in their positions most remote from F. Here, however, nose-carrier 241 extends horizontally, it is stationary in operation, and no portions of it extend vertically save that portion necessary to carry nose 241a rigidly and accurately in position alined with the portion of presser-finger 131 just below the needle reciprocating thru 131. Here, said nose-carrier 241, instead of extending vertically inside the pile-thread field between F on the right and K and LH on the left as in our prior case, is located at one side of LH and K horizontally (left, Fig. 2), and outside of the pile-thread field, all of 241 save its nose 241a lying further away from the pile-surface than does guard 276, 279; and the only part of 241 which extends into that field is the nose 241a as a matter of necessity to cooperate with finger 131; said small-ended nose, however extending substantially far toward base-fabric F beyond 241 and guard 279, 276 in the critical position of said guard almost outside the pile-thread field.

The results of the above construction are various by way of improvement upon the mechanisms of our prior case, i. e., among other advantages and with the operations of N, LH and K, and nose 241a itself substantially as before, (1) the pile-thread field is freed of substantial portions of the pile-forming mechanism, particularly parts of nose-carrier 241 other than 241a itself, (2) the pile-thread field is protected by guard 276, 279 from injury by the operations of LH and K which are parts of the mechanisms producing the pile-threads, (3) the loop-supporting surface 241B which holds the loops up, and the fabric-supporting nose 241a which holds base-fabric F from undue lateral broadside movement, are readily movable to be in or out of operative positions, (4) the needles N in respect of the little notch LN are improved for better cooperation with LH, and (5) the mountings of the knives K have been improved for the purpose of more convenient removal for sharpening,—for while the knives with a given sharpening will operate efficiently, when very sharp, throughout the manufacture of a plurality of rugs simultaneously in the machine, yet the knives must be removed for sharpening between jobs in order to be sharp enough for accurate operation, the perfection of the product being due as much to sharpness of knives as to any of the other cooperating elements of the multiple pile-forming mechanism, including the high rate of downward stroke of K for loop-cutting.

In Fig. 1 is illustrated an example of a case when, at one stage of the manufacture of a given plurality of duplicate pile-surface products, as rugs, simultaneously by the machine, a number of the multiple pile-mechanisms are in inoperative condition. At this stage all of the background, i. e., the principal portion of the pile-surface of the rugs, has been formed rapidly by the operation of all the multiple sets of pile-forming mechanisms. Here in a single rug exist three "repeat" designs of different color from the ground being indicated by the curved lines. These multiple designs have just been completed, in Fig. 1, by means of the illustrated set-up of pile-forming mechanisms where some of the latter are in inoperative positions such as nose 241a by virtue of the improved construction of Figs. 2-3 involving the manual swinging of support 241 of clamping nose 241a. But previously, the ground-work of cut-loop pile threads outside said curved designs, (all the pile-surface outside the indicated designs) has been formed at highest production rate by using all the duplicate groups of pile-forming mechanisms on both sides of base-fabric F; and that ground-work may have been done by either "square-work" or "curved work" by the same mechanism, as desired, at the will of the operator of the pantograph-control. However, for the production of the differently designed or colored pile-surfaces, within the boundaries of the illustrated respective repeat designs of Fig. 1, and after the completion of the pile ground, a portion of a certain number of the groups of pile-forming mechanisms have been put out of operative condition as shown in Fig. 1. That is, after the completion of the ground-work on F, the latter is moved in its vertical plane, not by short mesh-by-mesh movements as in loop-production, but over a distance great enough to bring a portion of the area within the designs shown, into position opposite the group of pile-forming mechanisms which are to form the pile-surface inside the designs. The reason why the pile-forming mechanisms inside such designs are put in inoperative condition is because their work already has been done in forming the ground pile surface so that they no longer have any useful function in connection with given rugs in the machine. In Fig. 1, the pile mechanisms are shown for only the middle and right-hand designs. Only one group of pile-forming mechanisms is operating on each of said designs, owing to the special nature of this design; the others having been made inoperative including noses 241a thereof. That is, the left hand group of mechanisms shown in Fig. 1, is operating on the middle design, as indicated not only by the presence of needle N at left, but by the operative position of nose-carrier 241 and nose 241a adjacent that left-hand needle and the middle design in Fig. 1. The other two groups of pile-forming mechanisms, Fig. 1, (second and third from left) which are within the field of operations on the middle design, have been put in the inoperative condition shown in Fig. 3, by the swinging, in Fig. 1, of the two duplicate members 241, with their pivoting pintles 243; and the two needles N of those two groups have been set back as illustrated at the extreme right-hand needle N in Fig. 1, so that these needles of the second and third groups from left, will not penetrate the portions of F on which the pile surface of the ground already has been completed; in short all mechanisms not needed for work on F can be kept away from it. The two knives K and loop-holders LH, of the sets of said two moved-back needles, remain in their mountings on support 230, because there are no loops for them to act on, on account of the needles being inoperative. Similarly for the right-hand design (two sets only of mechanisms being shown, fourth and fifth from left), only the left-hand set of the two is operating to produce the differently colored pile-threads for the right-hand repeat design; the next set, the last at right, being inoperative owing to the moving back of the needle as shown, and the swinging of 241 with its nose. Knife K here is omitted for clearness in showing of needle-support 128, its actual removal not being necessary, as above. All the knives K, loop-holders LH and needles N can be left on their support during the operation of forming the pile surfaces inside the curved designs, save for the moving ends of the needles not in use, and the removal of the threads from the moved back needles. Before commencing to produce the pile surface within the "repeat" designs, the ground-threads are removed for the needles which are to make such pile-threads, and replaced by threads of the desired color for such designs. If desired, instead of first forming the pile surface on the ground, and thru that within the central designs, such operations can be reversed. Of course the machine will continue to reciprocate K and LH vertically but harmlessly along the concave surface of the curved guard 276, 279; and likewise the presser-fingers 131 in all the sets continue idly reciprocating without injury to anything. But the principal advantage in this operation of the curved working of the repeat designs shown (in plurality on a single rug in the example shown) is that the number of noses 241a which hold base-fabric F from lateral broadside motion during pile-forming here is reduced to the minimum necessary for use with the single set of mechanisms for each repeat design; so that as F is moved in its vertical plane across the various sets or groups of mechanisms from or to the point of completion of the ground to or from the point of beginning curved work on the repeat designs, there is minimum disturbance or likelihood of injury to previously formed portions of the pile-surface by the noses either in the ground or inside the boundaries of said designs; and this result, obtained by the construction shown by which increased accuracy of work is obtained in various respects as described above, is obtained with minimum trouble and time, i. e., by swinging into inoperative positions those of nose-carriers 241 which are not needed for the production of the curved-work designs; as distinguished from operations involving dismantling and later constructional reassembling of such parts. All that is necessary here, after completion of the curved designs, to put all the groups of mechanisms into operating condition for the next job wherein all the sets can be used for highest production rate, is to re-set and re-thread the extra needles and to swing members 241 back to operative positions where they go automatically and firmly into accurately alined positions wherein noses 241a lie opposite fingers 131 just below such re-set needles N. By disturbance or injury to the pile surface by movements of noses 241a in close contact with the pile surface and across it, is meant, not destruction of such surface, but deformation thereof which has the appearance of tracks left by the noses,—an appearance not easy to remove without undesirable manual labor and expense upon rugs completed in the machine.

Two features are of principal importance in respect of keeping the pile-thread field free of all but the necessary mechanism such as noses 241a and needles N. First is the construction and arrangement of nose-carriers 241 by which no part of them save noses 241a occupies the pile-thread space to any degree at all injurious or objectionable; this being due to the horizontal extent of 241 itself so that it extends in a direction laterally away from F and the pile-surface thereon, and to that location of 241 at one side of LH and K and, Fig. 5, not at all (save at nose 241a itself) between F on one hand and LH and K on the other; and due to the fact that no part of 241 save 241a alone ever is moved toward F so as to occupy the pile-thread space or field. The above advantages exist even if 241 were not arranged for manual swinging on its pintle 243; altho such swinging arrangement further carries out the object of reduction to minimum of all parts in the pile-thread field, whenever the same is possible, even at times including some of the noses 241a, by providing for adjustment to positions outside such pile-field of all noses 241a not necessary for use on particular occasions, as in Fig. 1. The construction of 241 in all respects save for its swinging, is useful throughout the operations of the turfing mechanisms as on the ground-work; said swinging construction being useful additionally in connection with the different working successively in the ground and the inset designs. Inasmuch as operations similar to that illustrated in Fig. 1 as above, are involved in the production of all products of this machine which include curved designs of different color on a general ground, the provision of the additional feature of swinging members 241 is an important advantage and improvement.

Fig. 12 clearly illustrates the mechanisms and their operations by which the proper motions are imparted at proper times to the main supports common to the groups of pile-forming mechanisms which are located along the length of base-fabric F, Fig. 1; Figs. 12 and 1 showing the supports carrying the movable elements in each group by which the cut-pile surface is formed;

said automatically movable elements being LH and K, and N and 131 but not 241—241a. Nose-carrier 241 and its associated parts are omitted from Fig. 12 for clearness and because they are operatively stationary. Fig. 12 shows the movable pile-forming mechanisms of one group and their movable supporting means as in the other figures, the supports 228, 128 and 134 of the several movable pile-forming elements for all the groups of pile-forming mechanisms, of which one group is shown as in Fig. 5. And Fig. 12 shows the power transmissions suitable for operating said supports for the several sets of pile-forming mechanisms, connected between them on the one hand and on the other suitable cams by which the operations are executed in the improved time relation as above for production of a superior product by means of the novel structures above described, particularly in combination with novel stationary nose-carrier 241. These arrangements in Fig. 12 involve the advantages below in addition to the above advantages of having each of the novel operating cycles include the needle dwell and the relatively fast downward cutting movement of cutter K during the needle dwell and the relatively slow upward movement of loop-holder LH as the sharp point of its spur moves up respectively along little notch LN in needle N, big notch BN therein and thereby between a loop-leg on needle N and needle N itself without piercing the loop-leg thread. Said additional advantages involve those of the above novel cycle hereof as a whole and include the above pause or dwell of needle N in its home position of Fig. 5, which persists during approximately one-half of the reciprocating cycle of LH and K, i. e., during the entire quarter-second while LH and K are going down for cutting of loop L by K. Thus needle N stays in its home position of Fig. 5 until after the cutting of loop L is completed by the downward movement of K below its position in Fig. 5. And in Fig. 5, before cutting by K has commenced, presser-finger 131 already has been moved leftward to clamp F stationary against stationary nose 241a and the single foot of loop L against F, before N starts to move leftwardly from home toward F for loop projection; the above early clamping by 131 being not merely in anticipation of the leftward movement of N thru F (to hold F stationary after its meshes have been entered by the needles), but for the purpose of assisting later in holding the loop for cutting after N has gone home and is resting then. It is this clamping action of F between 131 and 241a and the pause or dwell of N at home, both during cutting, which effects the improved cutting operation and improved appearance of the cut-pile surface of the product, in respect of more nearly equal lengths of pile-threads and clearer cutting resulting in less fluff at the ends of the threads. An object of the long pause of N at home, including the cutting time by K, is to prevent motion of the needle from disturbing loop L in its desirable horizontal extension leftward of F during cutting i. e., resting on 241B, Fig. 2; for even with finger 131 in its clamping position in Fig. 5 during cutting by K, we have found that there is liability of such loop-disturbance by motion of N during loop-cutting. This, we found, was due to the fact that, in the Fig. 5 positions, finger 131 grips only one leg of loop L by its foot against F, the other leg of L extending to and thru N to feed-roll 172, Fig. 4. The leg of L of which the foot is clamped to F by 131 at this time is, Fig. 5A, the leg of uncut loop L which does not extend directly to the eye of the needle. In Fig. 5, K is about to go down to cut this loop L; and as K goes down and its left-hand inclined cutting edge takes the place of LH inside the head of loop L, then if N were moving rightward toward home at this time, it would tend to pull rightward the thread-leg of loop L connected to N and not yet formed with a foot to be gripped by 131 to F, i. e., the leg which, Fig. 4, extends from F toward and thru 131 in the slot between the tines thereof and to the needle in its position retracted rightward, Fig. 5, from F. Such undesirable rightward pulling of such loop-leg by needle N could and sometimes did cause the inside of the head of the loop to be pulled rightward by the needle movement against the cutting edge of K, tending to produce cutting of L by K before the proper upper portion of the inclined blade of K, going down, reached its proper position inside the loop head, and specifically, tending to cause cutting by an improper lower portion of the inclined blade of K due to the pulling by the needle of the inside of the loop-head against such improper lower portion of the inclined blade, the cutting being effected somewhat by the horizontal pull of the needle instead of exclusively by the downward movement of the inclined blade as intended; i. e., rightward movement of N during loop-cutting was liable to pull rightward more or less, the leg of loop L, Fig. 5A, which is not clamped by 131 as above and the result of that was not only to produce excessive fuzz by scraping of the knife edge along the yarn-thread of the loop but to shorten the loop so that when cut, the resulting pile-threads would be too short. By providing means for reciprocating N intermittently to include the dwell at home, Figs. 5 and 12, at the time when K is moving down without any premature cutting as above, K is premitted to hold L in leftward distended position of desirable length during cutting, the loop L not being shortened by rightward pull by N, so that both pile-threads of cut loop L thereby tend to be of the same length.

Such dwell of N at home at right, Fig. 5, also tends to prevent undesirable lengthening of some pile-threads at times, by their pulling leftward by K. Thus, if N on the other hand, be caused to move leftward away from home, Fig. 5, to project the next loop while K engages inside the head of a previously projected loop L, then the additional thread-length drawn by N from the yarn fed by roll 172, Fig. 4, by such movement of N toward and/or fabric F, might be liable to be taken up by the downward passage thru the loop-head of the inclined cutting edge of K, with the result not only of undue elongation of both legs of loop L resulting in longer cut pile-threads if such loop were short enough to be cut in two, but of injuries to the sides of the threads of loop L by relative movement of a thread across the sharp knife-edge, i. e., the downward movement of the inclined edge tending to elongate the loop and the sharp edge of the blade tending to move, in effect, broadside along the length of the thread. The former operations in such respects are improved by the dwell of N at home during the downward movement of K, i. e., the tendency of K to elongate the loop is reduced, with the result of improving the holding and cutting of the loop producing pile-threads in better or clearer condition and of more nearly uniform lengths extending from F. We have found the following also, as the result of delaying the leftward movement of N to project the next loop thru F until after loop L, Fig. 5, has been severed completely, i. e., until after the cutting of the head of loop L has caused discontinuance of the complete-loop condition at L thereby preventing the possibility of shortening of the loop by rightward movement of N during downward movement of K and preventing the possibility of lengthening of the loop and pile-threads by leftward pulling of the downward movement of the inclined bladeedge of K as when N might be moving leftward. That is, here, when, after completion of cutting of L, N at last is moved from home, Fig. 5, leftward to project the next loop thru F, then such leftward loop-projection does not disturb the proper position of the cut leg of the loop-thread of the previous loop which yet is connected to the needle for the formation of such next loop, because, after such cutting of the previous loop and during the latter portion of the time of dwell of N at home, Fig. 5, the presser-finger 131 has been moved rightward away from F, and framesupported fabric F has moved edgewise in its vertical plane, as by the pantograph into position for projection of the next loop, and said edgewise movement of F, cooperating with the inside edge of the slot in finger 131 has caused a portion of the thread yet connected to the needle on the needle side of fabric F, to extend as a foot of the next loop along the surface of the needle side of fabric F, so that said leftward movement of 131 against F flattens said newly extended foot portion of said thread against F and grips it so that the portion of the thread of the previous loop after having been cut to form a pile-thread, cannot be shortened by the next leftward movement of N to project the next loop. That is, N here is held at home not only after the cutting by K but after the withdrawal of 131 from F has permitted F to be moved edgewise, and after F has been so moved and after 131 has been returned to clamping position to form the new loop-foot and clamp it against F. This cut leg of the previous loop is held also by friction in its mesh of F alongside the other cut thread in the same mesh which other thread before cutting constituted a leg of loop L, Fig. 5. N projects the next loop thru F while its said new loop-foot just formed by the movements of F and 131, is clamped against F by 131, this foot constituting a continuation of the cut thread of the prior cut loop which extends to the new loop being projected.

When the point of LH moving up reaches the level of the horizontal path of movement of needle N, the needle already has begun its rightward movement back home so that the two loop-threads yet on N are more or less slack, the advantage of that being that the more or less slack loop-leg which bridges across big notch BN of the needle has less tendency to extend broadside into said notch in the path of the point of LH, the result of this timing and thread-slackness being to increase the assurance of the proper entrance of LH inside the loop on the needle, i. e. between the needle and the loop-leg bridging notch BN and more or less slack.

The principles and operations of the actuating mechanisms for the automatically operated pileforming mechanisms duplicated in the various groups disposed in horizontal succession along vertical base-fabric F, will be understood from the Fig. 12 diagram in connection with the above description of the tuning of the motions of the parts in the novel cycle of operations hereof; it being clear that the design of those power-transmitting mechanisms, including the connections to the timing cams, can be varied at the will of the designer of any particular machine in order to effect the novel cycle of operations above described.

In Fig. 12, the needle-support 128, 129 Fig. 5, is reciprocated left-right with pause at right, by any desired suitable design of linkage such for example as L1 operated by some such means as needle-cam NC fixed to main shaft 112 driven by pulley 111 and belt 105 from main driving motor M; shaft 112 continuously rotating counter-clockwise, as per arrow; and cam NC being designed pursuant to familiar engineering practice, to effect the above-described timely operations of the needles.

In Fig. 12, the rod 228, Fig. 5, is reciprocated up-down by any desired suitable design of linkage such for example as L2 operated by some such means as loop-holder and knife cam LKC on shaft 112 for operating loop-holders LH and cutters K, Fig. 5; this cam LKC also being designed to execute the timely operations of LH and K in the above novel cycle, and preferably the slower upward movements and faster downward movements of LH and K. Rod 228, pluralized along the machine moves support 230 up and down, Fig. 4, thereby moving LH and K up and down, Fig. 5.

In Fig. 12, the shaft 134, Fig. 5, is rocked rightleft by any desired suitable design of linkage such for example as L3, operated by some such means as presser-finger cam PFC on shaft 112 for operating presser-fingers 131, Figs. 4—5.

In Fig. 12, the above operations of needles N by linkage L1 and needle-support 128, are obtained in the timed relations above described, by means of suitable curvature of needle cam NC in its counter-clockwise rotation, as indicated generally and diagrammatically in the drawing. The leftward loop-projection thru fabric F by needles N, Fig. 5, is produced in counter-clockwise rotation of cam NC by that portion of the surface of the cam which is marked NP, approximately between 6 and 9 o'clock of the cam in the position shown in Fig. 12. Needles N are retracted rightward toward home, Fig. 5, by that portion of cam NC marked NR, approximately between 9 and 12 o'clock of the cam in the position shown in Fig. 12. The dwell or pause of N at home at right, Fig. 5, during downward movement of K and loop-cutting is effected by a long substantially flat portion of cam NC marked ND, at right and actually extending over approximately fifty per cent of the peripheral surface of the cam.

In Fig. 12, the above operations of LH and K by linkage 12 and rod 228 are obtained by a suitable curvature of cam LKC in its counter-clockwise rotation as indicated generally and diagrammatically in the drawings. The more rapid downward movement of K for cutting loop L during the dwell of N at right, Fig. 5, and cutting it more quickly and neatly and cleanly during said needle dwell, (ND, Fig. 12), is effected by the portion KF of cam LKC. The slower upward movement of LH for entering the loop L, Fig. 5, is effected by the portion LHS of cam LKC. The dwell or pause of LH and K, Fig. 5, at the bottom of their vertical movement by rod 228 is effected by the rounded portion LKD of cam LKC.

In Fig. 12, the above operations of presser-finger 131, Fig. 5, by support 134 and linkage L3, Fig. 12, are effected by suitable curvatures of cam PFC, as indicated generally in the drawings. The dwell of finger 131 against F for most of the time of each cycle of operations (including cutting of L by K and the time of moving base-fabric F) is caused by the rounded surface PFD extending most of the way around cam PFC. The movements of finger 131 away from its position of dwell pressing F against nose 241a, and immediately back to such position, are effected by portion PFR of cam PFC.

Fig. 12 is largely diagrammatic for clearness and it is understood that in constructing the machine, resort will be had to common mechanical expedients, including the common arrangements for cams, either external or internal, and with springs for the cam-rollers of external cams.

While swinging yarn-thread release-bars 152—153 may be employed in this case as in our said prior application, particularly in the production of uncut-loop surfaces, with suitable mechanism there shown for swinging them in timed relations, yet they are not needed and preferably are not used in the operation of loop-projection (as indicated in Fig. 4 by the fact that yarns Y do not extend around them) in cases wherein the above preferred cycle of operations is employed involving the needle-dwell. Also said bars 152—153 are not needed and preferably are not used in the operation (Fig. 4 above) in the production of pile-products wherein knives K are employed and act, as above, as secondary loop-holders, i. e., to hold a loop after LH has gone down out of the loop and K has gone down into the loop to engage the loop-head but has not cut thru the latter. The purpose of release-bars 152—153 when producing loop-surface articles such as hook-rugs is to get more thread supply to the needles and in that way to help the looper LH in the turfing process. But even if bars 152—3 be used during the production of pile-surfaces, their rightward swinging tends to pull back on a just-cut pile-thread thereby tending to shorten it; and similarly in the production of uncut loop surfaces wherein inequalities in the lengths of the loops are more readily observable than the case of cut-pile threads; all as pointed out in our said prior application which shows the times and directions of swinging of the two bars 152—153. Here, however, as indicated in Fig. 4, both said bars are excluded from the loop-projecting operations, particularly on account of the new cycle of operations involving the needle-dwell. In this new cycle, it is an object to keep yarns Y as quiet as possible at all times (particularly during loop-cutting), save when it is necessary to feed them off from roll 172, and an object to limit the durations of movements of the needles as by means of the relatively long needle-dwell between successive loop-projecting movements, and an object to limit the movements of the yarns to simple leftward movement corresponding with the leftward loop-projecting movements of the needles, Fig. 4, so that, in short, the best results in general are obtained by non-use or elimination of both bars 152—153. But here, as in our said prior application, feed-roll 172 may be given its intermittent partial rotation by means of duplicated ratchets and pawls, and brought to rest after each partial rotation by means of a continuously applied friction brake acting to stop the feed-roll upon cessation of movement of the ratchets by the pawls; the pawls being operated by cams mounted on main shaft 12, connected to roll 172 by any such linkages as shown for example in our said prior application, constructed to initiate movements of the pawls, ratchets and feed-roll 172 in time to provide yarns Y free of roll 172 for loop-projecting movements of the needles so that the needles can and do project the loops without excessive pulling on threads already extending thru fabric F in the form of loops or cut pile-threads, the design of the parts being such that each movement of feed-roll 172 frees lengths of Y sufficient for projection by the needles of loops of the desired length. The exact duration of the times of operating feed-roll 172 relative to the duration of movements of the needles, otherwise than the above is immaterial, altho as in our said prior application, roll 172 may start to pull yarns Y from spools A just before the start of loop-projecting movements by the needles, i. e., while they yet are pausing at home at right, provided, that, in producing cut pile surfaces, roll 172 should not be started until after completion of loop-cutting. After that, when knives K no longer are tending to pull leftwardly on yarns Y, roll 172 can be started at any time before N are started, even while fabric F is being moved edgewise, i. e., before fingers 131 return leftward to yarn-clamping position against the fabric; altho the needles will not be moved into the fabric until after 131 are in said clamping positions. In any case roll 172 will not start much sooner than the needles, altho its cam preferably is constructed to cause it to start as long before the needles as is practicable as above, and preferably altho not necessarily the initiation of movement of roll 172 is not delayed until after the start of the needles on account of the possibility that in that case the needles might shorten the pile-threads yet connected to yarns Y, notwithstanding the positions of fingers 131 in clamping relation to the yarns.

We claim:

1. In a machine of the kind disclosed wherein the base-fabric is movably supported for edgewise movement, the combination with a loop-holder and loop-cutter on the pile-side of the base-fabric and both reciprocable along the face of the same, the cutter cutting the loop during its movement in one direction; of a presser-finger and a needle on the other side and both reciprocable at right angles to the path of said loop-holder and cutter; a thin guard extending along the pile side of the fabric and facing the same and located between the fabric and the paths of the loop-holder and cutter and in a position almost outside of the field of the pile-threads; a nose-carrier also located on the pile side of the fabric but having its main portion located along the path of the loop-holder outside the pile-thread field, said carrier having a portion extending from its said main portion partially toward the base-fabric but also toward a position between said fabric and the paths of the loop-holder and cutter; and a fabric-clamping nose supported by said extending portion of the carrier in a position adjacent an end of said guard and extending between said end of the guard and the path of the needle and centrally of said path, said nose extending thru the pile-thread field toward the fabric in a direction toward a portion of said presser-finger closely below the path of the needle; said carrier and nose being formed with loop-supporting surfaces holding a loop against cutting movement of the cutter.

2. In a machine of the kind disclosed wherein the base-fabric is movably supported for edgewise movement, the combination with a loop-holder reciprocable along one face of the base-fabric, of a presser-finger and needle on the other side and both reciprocable; a thin and narrow guard extending along the loop-holder side of the fabric and having a convex curved portion facing the fabric and a concave portion facing the loop-holder, the latter being mounted for its reciprocation close along the concave surface of the guard, and the guard being located between the fabric and the path of movement of the loop-holder and in a position almost outside the field of the threads projected thru the fabric by the needle; a nose-carrier also located on the loop-holder side of the fabric but having its main portion located alongside the path of the loop-holder outside the field of the projected threads, said carrier having a portion extending from its said main portion partially toward the base-fabric but also toward a position between the fabric and the path of the loop-holder, said extending portion of the nose-carrier being formed with a curvature conforming with that of said guard, and said curved portion of the carrier lying adjacent an end of the guard and constituting an auxiliary portion of the guard lying between said end of the same and the horizontal path of the needle and centrally of said path; and a clamping nose extending from said curved portion of the carrier into the thread-field in a direction toward a portion of the presser-finger adjacent the path of the needle.

3. In a machine of the kind disclosed wherein the base-fabric is movably supported for edgewise movement, the combination with a loop-holder reciprocable along one side of the base-fabric, of a presser-finger and needle on the other side and both reciprocable; a thin guard extending along the loop-holder side of the fabric and facing the same and located between the fabric and the path of movement of the loop-holder and in a position almost outside the field of the threads projected thru the fabric by the needle; a nose-carrier also located on the loop-holder side of the fabric but having its main portion located alongside the path of the loop-holder outside the field of the projected threads, said carrier having a portion extending from its said main portion partially toward the base-fabric but also toward a position between said fabric and the path of the loop-holder; and a fabric-clamping nose supported by said extending portion of the carrier in a position extending from said guard toward the fabric into said thread-field in a direction alined with a portion of said presser-finger close to the horizontal path of the needle.

4. In a machine of the kind disclosed wherein the base-fabric is movably supported for edgewise movement, the combination with a loop-holder and loop-cutting knife-blade both reciprocable along the pile side of the fabric, of a presser-finger and needle on the other side of the fabric; a knife-support on the pile side of the fabric and reciprocable along the pile surface of the fabric, said support being formed with a relatively depressed portion forming an abutting wall; and means securing the knife in and to said depressed portion of its support with a side of the blade held against said wall; the cutting edge of the knife-blade extending away from the pile surface and at an angle to the direction of movement of the knife-support.

5. In a machine of the kind disclosed wherein the base-fabric is movably supported for edgewise movement, the combination with a loop-holder having a pointed end and reciprocable along one side of the fabric, of a needle on the other side of the fabric and reciprocable thru the fabric along a line close to the path of reciprocation of said loop-holder, said needle being formed with a notch for passage of the point of the loop-holder between the needle and a loop-leg thereon; an edge of said notch being formed also with a notch of which the surface lies in the path of the point of said loop-holder, the surface of said second notch being inclined toward the main portion of the needle and guiding the point of the loop-holder toward said main needle-portion and away from said loop-leg extending along the needle, insuring the passage of the loop-holder between said loop-leg and the needle and therefore between the two legs of the loop projected by the needle thru the fabric.

6. In a machine of the kind disclosed wherein the base-fabric is movably supported for edgewise movement, the combination with a loop-holder and loop-cutter reciprocable along the pile side of the fabric, of a presser-finger and a needle on the other side; a thin guard extending along the pile side of the fabric and facing the same and located between the fabric on one hand and the loop-holder and cutter on the other hand and in a position almost outside the field of the cut pile-threads and protecting the ends thereof from injury by contacts with the reciprocating loop-holder and cutter.

7. In a machine of the kind disclosed wherein the base-fabric is movably supported for edgewise movement, the combination with a loop-holder reciprocable along one side of the fabric, of a presser-finger and a needle on the other side of the fabric, a thin and narrow guard extending along the loop-holder side of the fabric and facing the same and located between the fabric and the path of movement of said loop-holder and in a position almost outside the field of the threads projected thru the fabric by the needle, said guard having a curvature on both sides, the convex side facing the fabric and contacting along a central vertical line with the ends of the projected threads, and the concave side facing the loop-holder; and said loop-holder being mounted for reciprocation close to the concave surface of said guard.

8. In a machine of the kind disclosed wherein the base-fabric is movably supported for edgewise movement, the combination with a loop-holder reciprocable along one side of the fabric, of a presser-finger and a needle on the other side of the fabric; a thin guard extending along the loop-holder side of the fabric and facing the same and located between the fabric and the path of movement of said loop-holder in a position almost outside the field of threads projected by the needle, and protecting the same from the reciprocating loop-holder.

9. In a machine of the kind disclosed wherein the base-fabric is movably supported for edgewise movement, the combination with a loop-holder and loop-cutter reciprocable vertically along one side of the base-fabric, of a presser-finger and a needle on the other side of the fabric both reciprocable; a nose-carrier on the loop-holder side of the fabric and having its main portion located alongside the path of the loop-holder and entirely outside the field of pile threads formed by said cutter; a stationary support for said main portion; said carrier having a portion extending from its said main portion partially toward the fabric but toward a position between the fabric and the vertical paths of movement of the loop-holder and cutter; and a fabric-clamping nose carried by said carrier in a location between the fabric and said vertical paths of the loop-holder and cutter and extending away from said paths toward the fabric in a direction alined with a portion of the presser-finger close to the path of horizontal movement of the needle; said extension of the main portion of the nose-carrier and said nose lying adjacent the path of the needle and alongside a loop projected thereby, and said carrier and nose being formed with continuing surfaces holding the loop in cutting position during the action of the cutter.

10. In a machine of the kind disclosed wherein the base-fabric is movably supported for edgewise movement, the combination with a loop-holder reciprocable along one side of the base-fabric, of a presser finger and a needle on the other side of the fabric both reciprocable; a nose-carrier on the loop-holder side of the fabric and having its main portion located alongside the path of the loop-holder and entirely outside the field of threads of loops projected thru the fabric by the needle; and a fixed support for said main portion of said carrier; said carrier having a portion extending from its said main portion partially toward the fabric and toward a position between the fabric and the path of movement of the loop-holder; and a fabric-clamping nose supported by said carrier in a position between the fabric and the path of the loop-holder and extending away from said path toward the fabric in a direction alined with a portion of the presser-finger close to the path of movement of the needle.

11. In a machine of the kind disclosed wherein the base-fabric is supported movably in a vertical plane, the combination with a loop-holder reciprocable vertically along one side of the base-fabric, of a presser-finger and a needle on the other side of the fabric; a nose-carrier operatively stationary on the loop-holder side of the fabric and mounted at a fixed point outside the field of threads projected by the needle; and a fabric-clamping nose carried by said carrier and operatively held thereby stationary in a horizontal position in the field of threads projected by the needle and alined with a portion of the presser-finger below the horizontal needle-path; said carrier being movable horizontally on its said fixed mounting point in a direction carrying the nose out of said thread-field.

12. In a machine of the kind disclosed wherein the base-fabric is supported in a vertical plane, the combination with a loop-holder reciprocable vertically along one side of the base-fabric, of a presser-finger and a needle on the other side of the fabric, the needle being movable horizontally thru the fabric and the presser-finger being movable into engagement with the feet of loops projected thru the fabric by the needle; a nose-carrier operatively stationary on the loop-holder side of the fabric but outside the field of threads projected by the needle; and a clamping nose carried by said carrier and operatively extending horizontally therefrom thru the thread-field toward the base-fabric in a stationary horizontal position alined with a portion of the presser finger below the horizontal path of the needle.

13. In a machine of the kind disclosed wherein the base-fabric is movably supported for edgewise movement, the combination with a loop-holder reciprocable along one side of the fabric, of a nose-carrier mounted at a fixed point outside the field of threads of loops projected by the needle; a presser-finger and a needle on the other side of the fabric; and a fabric-clamping nose operatively held stationary by the nose-carrier in a position inside said thread-field and in alinement with a portion of the presser-finger close to the needle; said nose-carrier being movable about its said fixed point of mounting, in a direction carrying its nose away from the fabric.

14. In a machine of the kind disclosed wherein the base-fabric is movably supported for edgewise movement, the combination with a loop-holder reciprocable along one side of the fabric, of a presser-finger and a needle on the other side of the fabric and both reciprocable, the needle being movable thru the fabric close to the path of the loop-holder; a nose-carrier having its main portion mounted at a fixed point outside the field of the threads of projected loops; and a fabric-clamping nose formed integrally with said carrier, extending toward the fabric and operatively held by the carrier in stationary position in said thread-field but in alinement with a portion of the presser-finger close to the path of the needle; the nose-carrier being movable about its said fixed mounting point in a direction carrying its nose away from the fabric.

15. In a machine of the kind disclosed wherein the base-fabric is movably supported for edgewise movement, the combination with a loop-holder and loop-cutter reciprocable along one side of the fabric, the loop-holder moving in one direction for loop-engagement and the cutter moving in the opposite direction for cutting; of a presser-finger and needle on the other side of the fabric and both reciprocable, the needle being movable thru the fabric in a direction close to the upward path of the loop-holder; and a nose-carrier and its nose mounted on the loop-holder side of the fabric at a point of the carrier outside the main portion of the field of threads of loops projected by the needle; the nose operatively extending from the carrier into said thread-field in a direction toward a portion of the presser-finger close to the path of the needle; and the carrier and nose being formed with surfaces holding a previously projected loop against the cutting movement of the cutter.

16. In a machine of the kind disclosed wherein the base-fabric is movably supported for edgewise movement, the combination with a loop-holder reciprocable along one side of the base-fabric, of a presser-finger and a needle on the other side of the fabric and both reciprocable, the needle being movable thru the fabric and the presser-finger being movable into engagement with the feet of loops projected thru the fabric by the needle; a nose-carrier mounted on the loop-holder side of the fabric at one side of the loop-holder and operatively extending stationarily outside the main portion of the field of threads of loops projected by the needle; and a fabric-clamping nose carried by said nose-carrier and operatively extending therefrom thru said thread-field toward the base-fabric in a position alined with a portion of the presser-finger close to the path of the needle.

17. In a machine of the kind disclosed wherein the base-fabric is movably supported for edgewise movement, the combination with a loop-holder reciprocable along one side of the base-fabric, of a presser-finger and a needle on the other side of the fabric and both reciprocable, the needle being movable thru the fabric and the presser-finger being movable into engagement with the feet of loops projected thru the fabric by the needle; a nose-carrier mounted on the loop-holder side of the fabric and operatively extending stationarily in a location outside the main portion of the field of threads of loops projected by the needle; and a fabric-clamping nose carried by said nose-carrier and operatively extending therefrom thru said thread-field toward the base-fabric in a direction alined with a portion of the presser-finger close to the path of the needle.

18. In a machine of the kind disclosed wherein the base-fabric is movably supported for edgewise movement, the combination with a loop-holder reciprocable along one side of the base-fabric, of a presser-finger and a needle on the other side of the fabric and both reciprocable, the needle being movable thru the fabric, and the presser-finger being movable into engagement with the feet of loops projected thru the fabric by the needle; an operatively stationary nose-carrier mounted on the loop-holder side of the fabric in a location at one side of the path of the loop-holder and outside the main field of threads of loops projected by the needle; and a clamping nose carried by said nose-carrier and operatively extending therefrom thru the loop-field toward the base-fabric in a position alined with a portion of the presser-finger close to the path of the needle.

19. In a machine of the kind disclosed wherein the base-fabric is movably supported for edgewise movement, the combination with a loop-holder mounted for reciprocation along one side of the base-fabric, and a clamping nose on the same side of the fabric, of a presser-finger and a needle mounted on the other side of the fabric for reciprocation toward and thru and away from the fabric, the presser-finger being mounted for its reciprocation from a position of rest at home against the fabric pressing the latter against said clamping nose, and said loop-holder being mounted for its reciprocation from a position relatively remote from the path of the needle and along a path extending close to and beyond the needle path; said fabric being movable in its plane while the needle is out of engagement with the fabric and when the presser-finger is not pressing the fabric against the clamping nose; and mechanisms simultaneously moving the loop-holder and needle, reciprocating the needle during the time of movement of the loop-holder in its direction for entering a loop on the needle, causing a lower rate of movement of the loop-holder in that direction than in the opposite direction of its reciprocation; and reciprocating the presser-finger between the times of successive movements of the needle and loop-holder past the paths of movement of one another.

20. In a machine of the kind disclosed wherein the base-fabric is movably supported for edgewise movement, the combination with a loop-holder and a loop-cutter mounted for reciprocation along one side of the base-fabric, and a clamping nose on the same side of the fabric; of a presser-finger and a needle mounted on the other side of the fabric for reciprocation toward and away from the fabric, the needle being mounted for reciprocation thru the fabric from a position of rest out of engagement with the fabric, the presser-finger being mounted for its reciprocation from a position of rest at home against the fabric pressing the latter against said clamping nose, and said loop-holder and cutter being mounted for their reciprocations from a position of rest relatively remote from the path of reciprocation of the needle thru the fabric; said base-fabric being movable in its plane while the needle is out of engagement with the fabric, and while the presser-finger is away from its home position, and while the loop-holder and cutter are approximately at their positions of rest; and mechanisms simultaneously moving the loop-holder, cutter, and needle, each intermittently, causing pauses of said elements in their positions at rest, causing the loop-holder and knife to move in their directions for engagement of the loop-holder in a loop projected by the needle, at a rate lower than their movements in the opposite direction for cutting of said loop by the cutter, said mechanisms also causing the needle to stay at rest during the loop-cutting by said cutter, and causing said presser-finger to stay in its home position throughout the time the needle extends thru the fabric and during the operation of loop-cutting.

21. In a machine of the kind disclosed wherein the base-fabric is movably supported for edgewise movement, the combination with a loop-holder and a loop-cutter mounted for reciprocation along one side of the base-fabric, and a clamping nose on the same side of the fabric, of a presser-finger and a needle mounted on the other side of the fabric for reciprocation toward and away from the fabric, the needle being mounted for reciprocation thru the fabric from a position of rest out of engagement with the fabric, the presser-finger being mounted for its reciprocation from a position of rest at home against the fabric pressing the latter against said clamping nose; said base-fabric being movable in its plane while the needle is out of engagement with the fabric and the presser-finger is away from its home position; and mechanisms simultaneously moving the loop-holder, cutter and needle, reciprocating the needle during the time of movement of the loop-holder in its direction to enter a loop projected thru the fabric by the needle, causing the needle to pause at rest during the time of movement of the cutter during its cutting of said loop, and reciprocating the presser-finger between the times of cutting of one loop by the cutter and of the projection of the next loop by the needle.

22. In a machine of the kind disclosed wherein the base-fabric is movably supported for edgewise movement, the combination with a loop-holder and a loop-cutter both mounted on a common support for reciprocation along one side of the base-fabric, and a fabric-clamping nose on the same side of the fabric, of a presser-finger and a needle mounted on the other side of the fabric for reciprocation toward and away from the fabric, the presser-finger being mounted for its reciprocation from a position of rest at home against the fabric pressing the fabric against said clamping nose, and the loop-holder being reciprocable along a path close to the path of the needle; said fabric being movable in its plane while the needle is out of engagement with the fabric and when the presser-finger is away from its home position; said loop-holder entering a loop projected by the needle when the loop-holder is moved by its support in one direction, and the cutter cutting said loop when said support moves in the opposite direction; and mechanisms effecting said reciprocations of said elements including said common support for the loop-holder and cutter, and moving said support faster in its direction of movement for operation of said cutter than in its direction for loop-engagement by said loop-holder.

23. In a machine of the kind disclosed wherein the base-fabric is movably supported for edgewise movement, the combination with a pointed loop-holder mounted for reciprocation along one side of the base-fabric, and clamping means on the same side of the fabric, of a presser-finger and a needle mounted for reciprocation on the other side of the fabric, the needle being reciprocable along a path close to the path of the loop-holder, and the needle being formed with a notch on its side adjacent the path of the loop-holder, and the edge of said notch in the path of the loop-holder approaching the notch being formed with a notch guiding the point of the loop-holder between the wall of the first notch and the loop-leg bridging said first notch; and mechanisms effecting said reciprocations of said elements and causing the point of the loop-holder to engage against said guiding needle-notch after the needle has projected a loop and after the needle has been started by its operating mechanism back homewardly, that is, while said notch-bridging portion of the loop-leg is in relatively slack condition facilitating the passage of the point of the loop-holder thru the loop on the needle.

24. In a machine of the kind disclosed wherein the base-fabric is movably supported for edgewise movement, the combination with a pointed loop-holder and a loop-cutter mounted for reciprocation along one side of the base-fabric, and clamping means on the same side of the fabric, of a presser-finger and a needle mounted for reciprocation on the other side of the fabric, the needle being movable from a position of rest along a path close to the path of the loop-holder; the clamping means and presser-finger cooperating in holding the fabric against both edgewise and broadside movements during the projection of a loop thru it by the needle; and mechanisms effecting said reciprocations of said parts, moving the point of the loop-holder thru a loop on the needle after the needle has completed projection of said loop and when the needle and loop thereon have been started back homewardly; the needle-operating mechanism causing a pause of the needle during the cutting of said loop projected by the needle and until completion of said cutting.

25. In a machine of the kind disclosed wherein the base-fabric is movably supported for edgewise movement, the combination with a loop-holder mounted for reciprocation along one side of the base-fabric, of a presser-finger and a needle mounted on the other side of the fabric for reciprocation to and from the latter; a support mounted on the loop-holder side of the fabric; a guard mounted on said support and extending from one side of said support along the fabric in a location between the fabric and the path of the loop-holder; a nose-carrier mounted on said support in a location at the opposite side from said guard, said carrier extending partially toward the fabric but outside the field of the threads of loops extending therefrom and extending along said extent of the guard along the fabric; and a clamping nose carried by said carrier and extending toward the fabric beyond the plane of the guard.

26. In a machine of the kind disclosed wherein the base-fabric is movably supported for edgewise movement, the combination with a loop-holder mounted for reciprocation along one side of the base-fabric, of an operatively stationary nose-carrier on the same side of the fabric; a presser-finger and a needle mounted for reciprocation on the other side of the fabric; a fabric-clamping nose carried by said carrier, operatively stationary and cooperating with said presser-finger; a support for said carrier in which the same is mounted for movement carrying said clamping-nose away from the fabric; and a spring and stopping means holding the carrier and nose in stationary fabric-clamping relation with the presser-finger.

27. In a machine of the kind disclosed wherein the base-fabric is movably supported for edgewise movement, the combination with a loop-holder mounted for reciprocation along one side of the base-fabric, of an operatively stationary nose-carrier on the same side of the fabric; a presser-finger and a needle mounted for reciprocation on the other side of the fabric; a fabric-clamping nose carried by said carrier, itself also operatively stationary and cooperating with said presser-finger; a support for said carrier in which the same is mounted for movement carrying said clamping-nose to and from its said stationary operative position; and spring means and stopping means holding said nose-carrier in each of its said positions.

28. In a machine of the kind disclosed wherein the base-fabric is movably supported for edgewise movement, the combination with a loop-holder mounted on one side of the base-fabric for reciprocation along the same, of a nose-carrier on the same side of the fabric; a presser-finger and a needle mounted for reciprocation on the other side of the fabric to and from the fabric-face; a clamping-nose carried by said carrier and cooperating with said presser finger; a support for said nose-carrier in which the latter is mounted for movement of the clamping nose back and forth away from the fabric; said nose-carrier structure being formed with two flat portions corresponding with its two positions; and a leaf-spring secured to said carrier-support and having its free end in position engaging successively each of said flat portions of said nose-carrier structure.

29. In a machine of the kind disclosed, wherein the base-fabric is held stationary in operating position from which it is movable edgewise in its plane, the combination with a needle successively projecting loops thru the fabric-meshes after edgewise movements of the fabric, of fabric-clamping means adjacent the other face of the fabric and alongside the path of the needle; a presser on the needle-side and reciprocable from and to a home position opposite said clamping means wherein it presses the fabric against the clamping means; a loop-holder on the clamping-means side of the fabric and reciprocable along the fabric-face in a path crossing the path of a thread-loop on the needle; mechanisms respectively moving the reciprocable needle and loop-holder simultaneously along their respective paths; and mechanism having a construction intermittently imparting relatively brief reciprocations to said presser but normally holding it at rest at home holding the fabric from both edgewise and broadside movements throughout each needle reciprocation, said presser itself having a construction clamping the thread connected to the needle against the stationary fabric as an anchorage for a loop in process of projection by the needle; the mechanisms which reciprocate the needle and loop-holder having constructions intermittently moving each across the path of the other while the loop-holder is being moved in the direction for entering the loop on the needle, toward the loop-holder position holding the loop against undesirable shortening by the needle-retraction; said presser in its home position during needle-reciprocation holding the thread of the loop held by the loop-holder, against undesirable longitudinal thread-movement around the loop-holder by homeward movement of the needle; said needle-reciprocating mechanism having a construction holding the needle at rest from the time the loop-holder is moved from its said position holding the projected loop, thereby preventing undesirable loop-shortening by needle-movement while the projected loop is not held by the loop-holder; said presser-reciprocating mechanism having a construction continuingly holding the presser at rest at home while the needle is held at rest and while the loop-holder is being moved away from its position holding the projected loop, and said mechanism construction causing each of said relatively brief reciprocations of the presser from and back home at a time before the next needle movement with a loop to be next projected; and the edgewise movement of the fabric during said brief time of separation of the presser from the fabric and separation from said thread connected to the needle, causing the formation of the thread-foot which permanently connects together the threads of successively projected loops, said foot lying between the fabric and presser in the homeward path of said brief presser-reciprocation, whereby the presser holds the thread of the loop already projected, against undesirable shortening by the next needle movement projecting the next loop and until the presser has been moved away from said permanent thread-foot freeing the fabric for its next edgewise movement.

30. In a machine of the kind disclosed, wherein the base-fabric is held stationary in operating position from which it is movable edgewise in its plane, the combination with a needle successively projecting loops thru the fabric-meshes after edgewise movements of the fabric, of fabric-clamping means adjacent the other face of the fabric and alongside the path of the needle; a presser on the needle-side and reciprocable from and to a home position opposite said clamping means wherein it presses the fabric against the clamping means; a loop-holder on the clamping-means side of the fabric and reciprocable along the fabric-face in a path crossing the path of a thread-loop on the needle; mechanisms respectively moving the reciprocable needle and loop-holder simultaneously along their respective paths; and mechanism having a construction intermittently imparting relatively brief reciprocations to said presser but normally holding it at rest at home holding the fabric from both edgewise and broadside movements throughout each needle reciprocation, said presser itself having a construction clamping the thread connected to the needle against the stationary fabric as an anchorage for a loop in process of projection by the needle; the mechanisms which reciprocate the needle and loop-holder having constructions intermittently moving each across the path of the other while the needle after loop-projection is being retracted homeward and while the loop-holder is being moved in the direction for entering the projected loop on the needle, toward the loop-holder position holding the loop against undesirable shortening by homeward movement of the needle; said presser in its said home position during needle-reciprocation holding the thread of the loop held by the loop-holder, against undesirable longitudinal thread-movement around the loop-holder by the homeward movement of the needle; said presser-reciprocating mechanism having a construction holding the presser at rest at home while the loop-holder is being moved away from its position holding the projected loop, and said mechanism construction causing each of said relatively brief reciprocations of the presser from and back home at a time before the next needle movement with a loop to be next projected; and the edgewise movement of the fabric during said brief time of separation of the presser from the fabric and separation from said thread connected to the needle, causing the formation of the thread-foot which permanently connects together the threads of successively projected loops, said foot lying between the fabric and presser in the homeward path of said brief presser-reciprocation, whereby the presser holds the thread of the loop already projected against undesirable shortening by the next needle-movement projecting the next loop, and until the presser has been moved away from said permanent thread-foot freeing the fabric for its next edgewise movement.

31. In a machine of the kind disclosed, wherein the base-fabric is held stationary in operating position from which it is movable edgewise in its plane, the combination with a needle successively projecting loops thru the fabric-meshes after edgewise movements of the fabric, of fabric-clamping means adjacent the other face of the fabric and alongside the path of the needle; a presser on the needle-side and reciprocable from and to a home position opposite said clamping means wherein it presses the fabric against the clamping means; a loop-holder on the clamping-means side of the fabric and reciprocable along the fabric-face in a path crossing the path of a thread-loop on the needle; a loop-cutter also on the clamping-member side of the fabric and also mounted for reciprocation along the fabric-face in a path crossing the path of the projected loop; means moving the reciprocable needle, loop-holder and loop-cutter simultaneously along their respective paths; and mechanism having a construction intermittently imparting relatively brief reciprocations to said presser but normally holding it at rest at home holding the fabric from both edgewise and broadside movements through-out each needle-reciprocation; said presser itself having a construction clamping the thread connected to the needle against the stationary fabric as an anchorage for a loop in process of projection by the needle; the mechanisms which reciprocate the needle and loop-holder having constructions moving each across the path of the other while the loop-holder is being moved in the direction for entering the loop on the needle, toward the loop-holder position holding the loop against undesirable shortening by the needle-retraction; said presser in its home position during needle-reciprocation holding the thread of the loop held by the loop-holder, against undesirable longitudinal thread-movement around the loop-holder by homeward movement of the needle; said loop-cutter being arranged with its cutting edge facing away from the fabric-face for engagement with the inside of the loop-head; said cutter-reciprocating means having a construction moving the cutter thru the loop and severing its head while the loop-holder is being moved away from its position holding the loop; said needle-reciprocating mechanism having a construction holding the needle at rest while the loop-holder is being moved from its loop-holding position and while the cutter is in cutting engagement with the loop, thereby preventing undesirable variation of length of loop-threads during the time after the loop-holder has been moved from loop-holding position and until completion of loop-severing; said presser-reciprocating mechanism having a construction continuingly holding the presser at rest at home while the needle is being held at rest and throughout the loop-severing, said mechanism construction causing said relatively brief reciprocation of the presser from and back home at a time after completion of loop-severing but before the next needle movement with a loop next to be projected; and the edgewise movement of the fabric during said brief time of separation of the presser from the fabric and separation from said thread connected to the needle, causing the formation of the thread-foot which permanently connects together the threads of successively projected loops, said foot lying between the fabric and presser in the homeward path of said brief presser-reciprocation, whereby the presser holds the severed thread of the previously projected loop which is connected to said foot, against undesirable shortening by the next reciprocation of the needle from rest, in projecting the next loop and returning to rest.

32. In a machine of the kind disclosed, wherein the base-fabric is held stationary in operating position from which it is movable edgewise in its plane, the combination with a needle successively projecting loops thru the fabric-meshes after edgewise movements of the fabric, of fabric-clamping means adjacent the other face of the fabric and alongside the path of the needle; a presser on the needle-side and reciprocable from and to a home position opposite said clamping means wherein it presses the fabric against the clamping means; a loop-holder on the clamping-means side of the fabric and reciprocable along the fabric face in a path crossing the path of a thread-loop on the needle; a loop-cutter also on the clamping-member side of the fabric and also mounted for reciprocation along the fabric-face in a path crossing the path of the projected loop; means moving the reciprocable needle, loop-holder and loop-cutter simultaneously along their respective paths; and mechanism having a construction intermittently imparting relatively brief reciprocations to said presser but normally holding it at rest at home holding the fabric from both edgewise and broadside movements throughout each needle-reciprocation; said presser itself having a construction clamping the thread connected to the needle against the stationary fabric as an anchorage for a loop in process of projection by the needle; the mechanisms which reciprocate the needle and loop-holder having constructions moving each across the path of the other while the loop-holder is being moved in the direction for entering the loop on the needle, toward the loop-holder position holding the loop against undesirable shortening by the needle-retraction; said presser in its home position during needle-reciprocation holding the thread of the loop held by the loop-holder, against undesirable longitudinal thread-movement around the loop-holder by homeward movement of the needle; said loop-cutter being arranged with its cutting edge facing away from the fabric-face for engagement with the inside of the loop-head; said cutter-reciprocating means having a construction moving the cutter thru the loop and severing its head while the loop-holder is being moved away from its position holding the loop; said fabric-clamping means adjacent the fabric and alongside the path of the needle being formed with a bearing surface for the loop holding it in desired cutting position against movement therefrom by the cutting movement of the cutter; said needle-reciprocating mechanism having a construction holding the needle at rest while the loop-holder is being moved from its loop-holding position and while the cutter is in cutting engagement with the loop, thereby preventing undesirable variation of length of loop-threads during the time after the loop-holder has been moved from loop-holding position and until completion of loop-severing; said presser-reciprocating mechanism having a construction continuingly holding the presser at rest at home while the needle is being held at rest and throughout the loop-severing, said mechanism construction causing said relatively brief reciprocation of the presser from and back home at a time after completion of loop-severing but before the next needle movement with a loop next to be projected; and the edgewise movement of the fabric during said brief time of separation of the presser from the fabric and separation from said thread connected to the needle, causing the formation of the thread-foot which permanently connects together the threads of successively projected loops, said foot lying between the fabric and presser in the homeward path of said presser-reciprocation, whereby the presser holds the severed thread of the previously projected loop which is connected to said foot, against undesirable shortening by the next reciprocation of the needle from rest, in projecting the next loop and returning to rest.

33. In a machine of the kind disclosed, wherein the base-fabric is held stationary in operating position from which it is movable edgewise in its plane, the combination with a needle successively projecting loops thru the fabric-meshes after edgewise movements of the fabric, of fabric-clamping means adjacent the other face of the fabric and alongside the path of the needle; a presser on the needle-side and reciprocable from and to a home position opposite said clamping means wherein it presses the fabric against the clamping means; a loop-holder on the clamping-means side of the fabric and reciprocable along the fabric-face in a path crossing the path of a thread-loop on the needle; a knife-blade also on the clamping-member side of the fabric and also mounted for reciprocation in a path crossing the path of the projected loop; mechanism reciprocating the needle; mechanism having a construction imparting relatively brief reciprocations to said presser but normally holding it at rest at home holding the fabric from both edgewise and broadside movements throughout each needle-reciprocation; said presser itself having a construction clamping the thread connected to the needle, against the then stationary fabric as an anchorage for a loop in process of projection by the needle; said loop-holder and knife-blade having portions respectively extending toward one another, said knife-blade being arranged with its cutting edge facing away from the fabric-face and inclined from its loop-entering end in a direction away from the fabric, all whereby the loop-holder enters the loop on the needle in one direction of reciprocation and the knife-blade enters the loop in the other direction of reciprocation; means simultaneously reciprocating both the loop-holder and knife-blade, said means having a construction and arrangement moving them in the direction of loop-holder entrance into the loop during the two-way reciprocation of the needle; said needle-reciprocating mechanism having a construction holding the needle at rest during the opposite direction of movement of the loop-holder and knife blade, while the loop-holder is being moved from its loop-holding position and while the knife is approaching its cutting position and its inclined edge is completing the severing thru the loop-head, such needle-rest preventing undesirable variation of loop-threads by needle-movement; said presser-reciprocating mechanism having a construction continuingly holding the presser at rest at home while the needle is being held at rest and throughout the loop-severing, said mechanism construction causing said relatively brief reciprocation of the presser from and back home at a time after completion of loop-severing but before the next needle movement with a loop next to be projected; and the edgewise movement of the fabric during said brief time of separation of the presser from the fabric and separation from said thread connected to the needle, causing the formation of the thread-foot which permanently connects together the threads of successively projected loops, said foot lying between the fabric and presser in the homeward path of said brief presser-reciprocation, whereby the presser holds the severed thread of the previously projected loop which is connected to said foot, against undesirable shortening by the next reciprocation of the needle from rest, in projecting the next loop and returning to rest.

34. In a machine of the kind disclosed wherein the base-fabric is held in operating positions in a frame movable to move the fabric edgewise in its own plane according to the desired design of the product, the combination with a needle mounted on one side of the fabric for reciprocation therethru, of a fabric-clamping-means mounted on the other side of the fabric; a presser on the needle-side of the fabric and mounted for reciprocation from and to a position of rest at home pressing the fabric against said clamping means, holding the fabric from movement and clamping the feet of successive loops against the needle-side of the fabric, said presser being formed with a needle-passage close to said clamping means; a pointed loop-holder on the clamping-means side of the fabric and mounted for reciprocation along the fabric in a path crossing the needle-path, the needle being formed with a longitudinal groove only on its side facing away from the loop-holder path and formed with a notch on its opposite side in said path alongside the main body of the needle; mechanisms respectively reciprocating the needle, presser and loop-holder and having constructions moving the point of the loop-holder across the needle-path in the direction moving said point thru the loop on the needle at the instant when the notched portion of the needle is being moved across the path of said point of the loop-holder; and mechanism moving the presser from and back to its home position while the needle is out of engagement with the fabric or the fabric is being moved edgewise in its plane.

35. In a machine for the purposes described, wherein the base-fabric is supported by a frame movable edgewise in its plane according to the desired design of the product, to present empty meshes successively for loop-projection, the combination with a reciprocable needle, presser, and loop-holder; of mechanisms operating said reciprocable members, said mechanisms having cooperating constructions moving the needle back and forth thru the fabric while the loop-holder is being moved in a direction toward and across the path of the needle, and holding the presser in home position against the fabric and pressing the first foot of a said given loop against the fabric while the loop-holder is being moved back and forth and until after the needle has been moved back out of the fabric, and until after the loop-holder has been moved out of position holding said given loop and until just before the projection of the next loop; the next home position of the presser, after edgewise fabric-movement, pressing against the fabric the second foot of said given loop while the next loop is being projected.

36. In a machine for the purposes described, wherein the base-fabric is supported by a frame movable edgewise in its plane according to the desired design of the product, to present empty meshes successively for loop-projection, the combination with a reciprocable needle, presser, loop-holder and knife, of mechanisms operating said reciprocable members, said mechanisms having cooperating constructions holding the preser in home position against the fabric and pressing the first foot of a given loop against the fabric while the loop-holder and knife are being moved back and forth and until after the completion of cutting of the given loop by said knife, holding the needle at rest during and until completion of cutting of the given loop, and moving the presser from and back to its home position after completion of cutting of the given loop but before the projection of the next loop by the next movement of the needle, the presser upon its said return home against the fabric, clamping thereto the second foot of the loop just cut which is the first foot of the next loop to be projected.

37. In a machine for the purpose described, wherein the base-fabric is supported by a frame movable edgewise in its plane according to the desired design of the product, to present empty meshes successively for loop-projection, the combination with a reciprocable needle, loop-holder and knife, of mechanisms operating said reciprocable members, said mechanisms having cooperating constructions holding the needle at rest while the loop-holder is being started away from its loop-holding position, and while the knife is being moved into and enters the loop and into cutting engagement therewith, and until completion of loop-cutting by the knife.

38. In a machine for the purposes described, wherein the base-fabric is supported by a frame movable edgewise in its plane according to the desired design of the product, to present empty meshes successively for loop-projection, the combination with a reciprocable needle, presser, loop-holder and knife, of mechanisms operating said reciprocable members, said mechanisms having cooperating constructions holding the presser at rest in home position against the fabric and against the foot of the first leg-thread of a loop during reciprocation of the needle and until completion of cutting of said loop by the knife, starting the loop-holder and needle toward their respective paths both at about the same instant, the loop-holder being moved across the needle-path at a rate lower than the latter cutting movement of the knife in the opposite direction, the loop-holder being moved across the needle-path as the needle is being moved on its way home after loop-projection, holding the needle at rest while the loop-holder is out of position holding said loop and during movement of the knife cutting said loop, and holding the loop-holder and knife at rest after completion of cutting said loop and approximately at the time when the presser is being moved from and back home against the fabric while the fabric is being moved edgewise.

39. In a machine for the purposes described, wherein the base-fabric is supported by a frame movable edgewise in its plane according to the desired design of the product, to present empty meshes successively for loop-projection, the combination with a reciprocable needle, presser and loop-holder, of mechanisms operating said reciprocable members, said mechanisms having cooperating constructions moving the needle in both directions while moving the loop-holder in its direction entering a given projected loop; holding the presser at home against the fabric pressing the first foot of said given loop against the fabric during movements of the loop-holder and needle at right angles to one another in both directions of their reciprocations; holding the needle at rest while the loop-holder is being moved from its loop-holding position; and moving the presser from and back home while the fabric is being moved edgewise, after the loop-holder has been moved out of position holding said given loop-foot, and before the next movement of the needle into the fabric, said return home of the presser pressing against the fabric the second foot of said given loop which is the first foot of the next, whereby the two threads of said given loop are held in desirable positions by two successive home positions of the presser before and after said rest position of the needle between its successive reciprocations.

40. In a machine for the purposes described, wherein the base-fabric is supported by a frame movable edgewise in its plane according to the desired design of the product, to present empty meshes successively for loop-projection, the combination with a reciprocable needle, presser, loop-holder and knife, of mechanisms operating said reciprocable members, said mechanisms having cooperating constructions holding the needle at rest while the knife is being moved in the direction for loop-cutting; during the time between edgewise movement of the fabric, holding the presser at home lying against the fabric and pressing against it the first foot of a given loop being projected and cut; and said cooperating constructions moving the presser from and back home after completion of cutting by the knife, after edgewise fabric-movement and before the needle again has been moved into the fabric for projection of the next loop; the presser-finger upon its return home pressing against the fabric the second foot of the given loop which is the first foot of the next loop about to be projected.

41. In a machine for the purposes described, wherein the base-fabric is supported by a frame movable edgewise in its plane according to the desired design of the product, to present empty meshes successively for loop-projection, the combination with a reciprocable needle, presser-finger, loop-holder and knife, of mechanisms operating said reciprocable members, said mechanisms having cooperating constructions moving the needle into the fabric for projection of a given loop after the knife has been moved for completion of cutting the previously projected loop and while the loop-holder is being moved toward the needle-path into position for entering and holding said given loop being projected, and while the knife is being moved in a direction away from said previous loop just cut by it and during the projection of the given loop being projected preparatory to the movement of the knife in the opposite direction thru said last loop for severing the same.

42. In a machine for the purposes described, wherein the base-fabric is supported by a frame movable edgewise in its plane according to the desired design of the product, to present empty meshes successively for loop-projection, the combination with a loop-projecting needle, of a pointed holder for entering and temporarily holding projected loops, the needle and the holder being mounted for rectilinear reciprocation in paths substantially at right angles to one another; and mechanisms intermittently effecting said reciprocations of needle and holder and coordinated for starting the movement of each toward the path of the other at about the same time-portion of their cycle of cooperation.

43. In a machine for the purposes described, wherein the base-fabric is supported by a frame movable edgewise in its plane according to the desired design of the product, to present empty meshes successively for loop-projection, the combination with a reciprocable needle, presser and loop-holder, of mechanisms having cooperating constructions moving the presser from and back to its home position clamping the first foot of a needle-projected loop to the needle side of the base-fabric, at the time the loop-holder is out of loop-holding position and during the time the loop-holder is in its position more remote from the needle-path, and while the needle is out of engagement with the fabric; said fabric being movable in its plane while so freed of the presser and needle.

44. In a machine for the purposes described, wherein the base-fabric is supported by a vertical frame movable edgewise in its vertical plane according to the desired design of the product, the combination with fabric clamping-means, of a reciprocable needle, presser, loop-holder and knife, and mechanisms operating said reciprocable members, said mechanisms having cooperating constructions which move the needle in both directions thru the fabric while the loop-holder and knife are being moved vertically upward along the face of the fabric, and move the loop-holder up across the path of the needle before the needle has pulled the loop back out of the path of the loop-holder whereby the latter enters the loop and holds it against movement of the needle; said mechanisms also having cooperating constructions which hold the presser at home, pressing the first foot of the given loop against the fabric while the loop-holder and knife are being moved both up and down; said clamping-means lying close below the needle-path and between the fabric and the vertical paths of the loop-holder and knife, in a position and formed with a top surface holding the loop up from downward sagging from the time the needle leaves it held by the loop-holder until completion of cutting of the loop by the knife.

45. In a machine for the purposes described, wherein the base-fabric is supported by a frame movable edgewise in its plane according to the desired design of the product, to present empty meshes successively for loop-projection, the combination with loop-supporting means, of a reciprocable needle, presser, loop-holder and knife-blade; the presser cooperating with said loop-supporting means as a back stop for the fabric; mechanisms operating said reciprocable members; the loop-holder and knife being supported at relatively remote positions thereof, and their free ends having constructions normally holding said ends together but movable from one another; said operating mechanisms having cooperating constructions moving the presser from and back to its home position, pressing the fabric against said loop-supporting means and clamping to the needle side of the base-fabric, the first foot of a given loop which is the second foot of the previously projected loop, said movement of the presser being effected at a time after the loop-holder has been moved out of position holding said loop, and when it is in its positions more remote from the needle-path; said operating mechanisms and said loop-holder and knife also having cooperating constructions which move the free end of the loop-holder into the loop on the needle while the needle, loop-holder and knife are being moved in relations to one another which cause temporary separation of the said free ends of loop-holder and knife from one another, and cause their passage along opposite sides of the needle, the flat portion of the knife-blade and one side of the needle moving along one another in mutual contact; said loop-supporting means extending close to one side of the needle-path and lying between the fabric and the paths of the loop-holder and knife, in a position and having a surface holding the loop in cutting position against movement by the cutting movement of the knife; and said normal tendency of the free ends of the loop-holder and knife to stay together after the needle has left the loop held by the loop-holder, causing the knife to follow the loop-holder and enter and cut the loop as the loop-holder is moved out of its loop-holding position.

46. In a machine for the purposes described wherein the base-fabric of great area is supported by a vertical frame freely movable edgewise in any desired direction in its vertical plane according to the desired design of the product, in combination, in the improvement in simultaneously producing a plurality of products each having a portion different from the ground, a plurality of fabric-clamping noses operatively stationary adjacent the face of the base-fabric, of carriers supporting said noses in their stationary operative positions, and means supporting said carriers in desired locations distributed on one side of the base-fabric and holding the clamping-noses operatively stationary adjacent distributed portions of the face of the fabric; sets of loop-producing mechanisms including needles, pressers and loop-holders cooperating with said clamping noses respectively and grouped about the nose-carriers on opposite sides of the base-fabric, said sets being pluralized for each of a plurality of duplicate products fabricated on the same base-fabric; said nose-carriers being individually and independently movable manually, together with their noses, from their positions cooperating with said sets of loop-producing mechanisms thereby removing the noses from positions injuring completed portions of the fabric when the fabric as a whole is moved edgewise to a new position for the fabrication of a different portion of the design, and removing, before such movement of the base-fabric, the clamping-noses not required for fabrication of the different portion of the design; said pressers clamping the fabric against said distributed clamping-noses in their normal stationary positions; said clamping-noses in their operative stationary positions lying close below the paths of the needles and between the fabric and the paths of the loop-holders, in positions and having top surfaces holding up needle-projected loops from sagging by gravity upon withdrawal of the needles and loop-holders from the loops; and said reciprocable pressers holding distributed portions of the fabric against said clamping-noses in their operative stationary positions while the needles are being reciprocated thru the fabric and the loop-holders are being reciprocated into and out of the loops, and simultaneously clamping the first feet of the loops being simultaneously projected, to the fabric clamped against the stationary noses.

47. In a machine of the kind described wherein the base-fabric is supported for edgewise movement across the path of the loop-projecting needles, the combination with the needles all on one side of the base-fabric, of the loop-holders on the opposite or loop-side; operatively stationary nose-shaped loop-feet clamping members and carriers therefor, also on the loop-side of the base-fabric; cooperating loop-feet clamping presser-fingers on the needle-side and having locations relative to the needles wherein individually they operatively face a loop-foot thread lying flat against the needle side of the base-fabric and connecting the thread of the first leg of a loop being projected, with the thread of the second leg of a loop next previously projected, said fingers being movable against said loop-feet threads; said cooperating clamping noses having operative locations wherein their blunt ends lie opposite said loop-feet facing presser-fingers; said nose-carriers having locations outside the field of loop-threads projected thru the base-fabric by the needles but said clamping noses themselves operatively extending from their carriers toward the base fabric into said loop-field and close to the fabric in its position when not engaged by the presser-fingers; but the carriers and noses together and severally as independent unitary pairs being movable manually for movement of the noses out of said loop-field; means operating the needles and loop-holders; and means operating the presser-fingers intermittently between successive edgewise movements of the base-fabric, to clamp the fabric and said loop-feet between said fingers and the blunt ends of the clamping noses in the loop-field.

48. In a machine of the kind disclosed wherein the base-fabric is movably supported for edgewise movement, the combination with a pointed loop-holder mounted for reciprocation along one side of the base-fabric, and a stationary clamping element on the same side of the fabric, of a reciprocable presser-finger and a reciprocable needle mounted for reciprocation on the other side of the fabric, the needle being reciprocable thru the fabric along a path close to and at right angles to the path of the loop-holder on the other side of the fabric, and the reciprocable presser-finger intermittently, between successive movements of the base-fabric, cooperating with said clamping element in clamping the base-fabric and the loop-feet on the needle side of the fabric and close to the needle; mechanism for moving the base-fabric in all directions in its plane for production on it of any desired design by the needles; and mechanisms imparting said reciprocations to said needle, loop-holder and presser-finger and causing the loop-holder to cross the path of and enter a loop on the needle after the needle has projected the loop and after the needle has been started by its operating mechanism back toward its home position, that is, while the loop is slack on the needle, and moving the presser-finger into clamping relations with the stationary clamping element before the needle engages the base fabric, and moving the presser-finger out of such clamping relation after the needle has been disengaged from the fabric; said loop-holder and presser-finger and clamping element being arranged for cooperation in determining the length of the loops after the needle has been started back home.

WILLY HOFMANN.
OTTO FRANK GERBERT.